US010807443B2

(12) United States Patent
Stiver

(10) Patent No.: US 10,807,443 B2
(45) Date of Patent: Oct. 20, 2020

(54) AIR VENT FOR A VEHICLE HVAC SYSTEM

(71) Applicant: Honda Motor Co., Ltd., Tokyo (JP)

(72) Inventor: Brendan Christopher Stiver, Powell, OH (US)

(73) Assignee: Honda Motor Co., Ltd., Tokyo (JP)

(*) Notice: Subject to any disclaimer, the term of this patent is extended or adjusted under 35 U.S.C. 154(b) by 442 days.

(21) Appl. No.: 15/798,810

(22) Filed: Oct. 31, 2017

(65) Prior Publication Data
US 2019/0126727 A1 May 2, 2019

(51) Int. Cl.
*B60H 1/34* (2006.01)

(52) U.S. Cl.
CPC ... *B60H 1/3421* (2013.01); *B60H 2001/3464* (2013.01); *B60H 2001/3471* (2013.01); *B60H 2001/3478* (2013.01); *B60H 2001/3492* (2013.01)

(58) Field of Classification Search
CPC .......... B60H 1/24; B60H 1/34; B60H 1/3414; B60H 1/3421; B60H 1/3428; B60H 1/3435; B60H 2001/3471; B60H 2001/3478; B60H 1/3442
USPC ............... 454/69, 109, 143, 152–153, 155
See application file for complete search history.

(56) References Cited

U.S. PATENT DOCUMENTS

| 5,188,561 | A | 2/1993 | Nissimoff | |
|---|---|---|---|---|
| 6,533,655 | B2 | 3/2003 | Demerath et al. | |
| 8,662,970 | B2 | 3/2014 | Nagasaka et al. | |
| 9,162,551 | B2 | 9/2015 | Yamamoto et al. | |
| 9,370,986 | B2 | 6/2016 | Londiche et al. | |
| 2007/0111653 | A1* | 5/2007 | Endou | B60H 1/3421 454/155 |
| 2008/0146139 | A1* | 6/2008 | Terai | B60H 1/3421 454/155 |
| 2013/0078900 | A1* | 3/2013 | Zalan | B60H 1/3421 454/152 |
| 2015/0065031 | A1* | 3/2015 | Shibata | B60H 1/3421 454/322 |
| 2015/0360536 | A1* | 12/2015 | Terai | B60H 1/00678 454/333 |
| 2016/0313025 | A1* | 10/2016 | Nemoto | F24F 13/06 |

(Continued)

FOREIGN PATENT DOCUMENTS

| CN | 104786781 | 7/2015 |
|---|---|---|
| CN | 106488854 | 3/2017 |

(Continued)

*Primary Examiner* — Vivek K Shirsat
*Assistant Examiner* — Ko-Wei Lin
(74) *Attorney, Agent, or Firm* — Rankin, Hill & Clark LLP

(57) ABSTRACT

An air vent for a vehicle HVAC system includes a duct, a forward fin connected to an air outlet at a first end portion of the duct, and plurality of rear fins connected to an air inlet at a second end portion of the duct. The forward fin rotatable about a transverse direction of the duct is configured to adjust the direction of airflow in a vertical direction of the duct. The plurality of rear fins rotatable about the vertical direction is configured to adjust the direction of airflow in a longitudinal direction of the duct. A shut-off valve is rotatably connected to a central portion of the duct and positioned between the forward fin and the plurality of rear fins. The shut-off valve is directly connected to the forward fin and configured to rotate about the transverse direction via movement of the forward fin in the longitudinal direction.

20 Claims, 30 Drawing Sheets

(56) References Cited

U.S. PATENT DOCUMENTS

| | | | |
|---|---|---|---|
| 2017/0021701 A1* | 1/2017 | Belzons | B60H 1/3421 |
| 2017/0100988 A1 | 4/2017 | Belzons et al. | |
| 2017/0120721 A1 | 5/2017 | Zhang et al. | |
| 2017/0176045 A1* | 6/2017 | Terai | B60H 1/345 |
| 2017/0259649 A1* | 9/2017 | Shibata | B60H 1/3421 |
| 2017/0305238 A1* | 10/2017 | Brinas | B60H 1/00564 |
| 2018/0147914 A1* | 5/2018 | Ito | B60H 1/00671 |
| 2018/0170149 A1* | 6/2018 | Fidh | B60H 1/00857 |
| 2018/0170153 A1* | 6/2018 | Lee | B60H 1/3421 |
| 2019/0118620 A1* | 4/2019 | Lee | B60H 1/345 |

FOREIGN PATENT DOCUMENTS

| | | |
|---|---|---|
| DE | 102014200544 | 7/2014 |
| DE | 102013101887 | 3/2015 |
| DE | 102014100441 | 7/2015 |
| DE | 10215101116 | 8/2015 |
| EP | 3109079 | 12/2016 |
| WO | 2016188993 | 12/2016 |

* cited by examiner

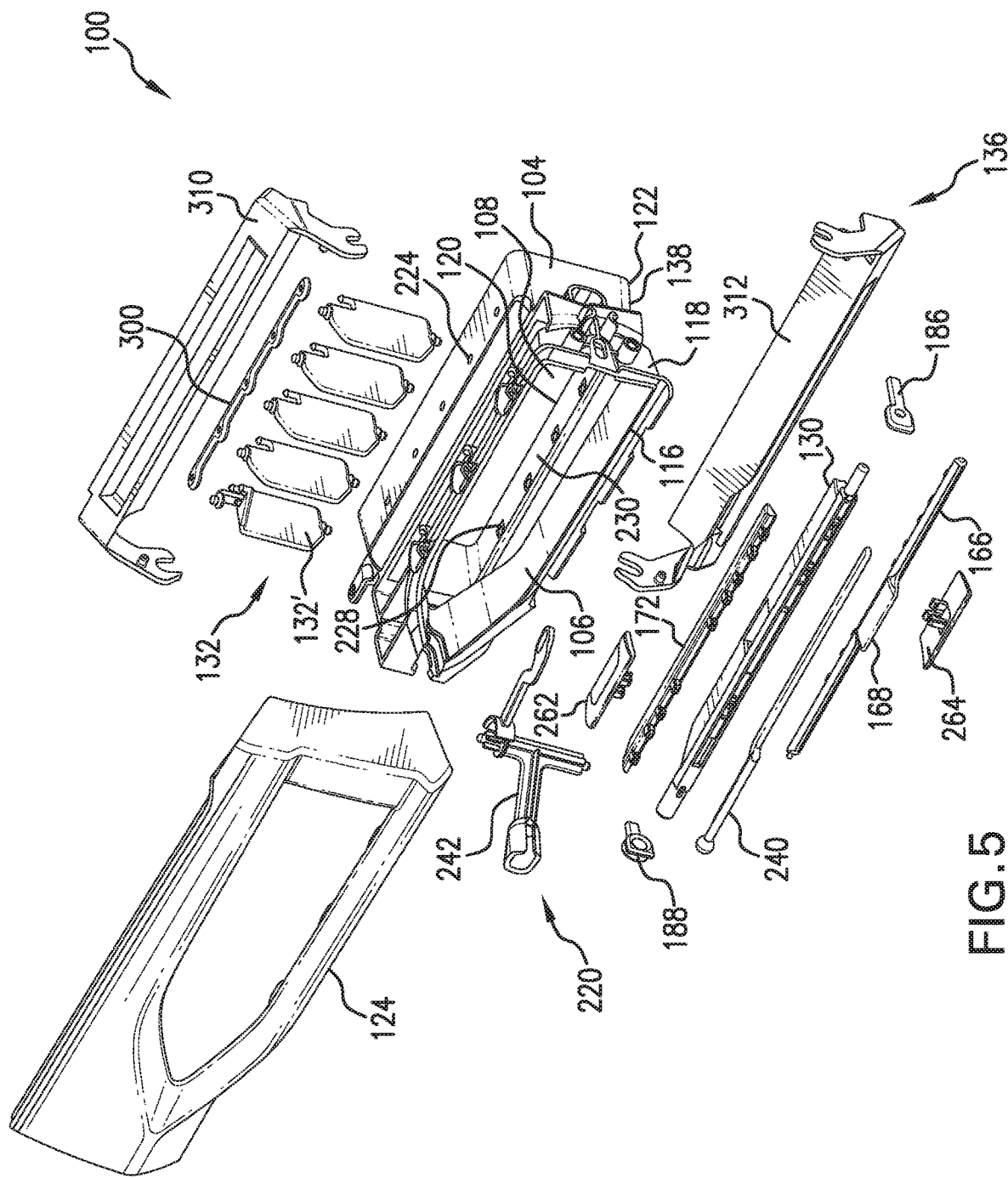

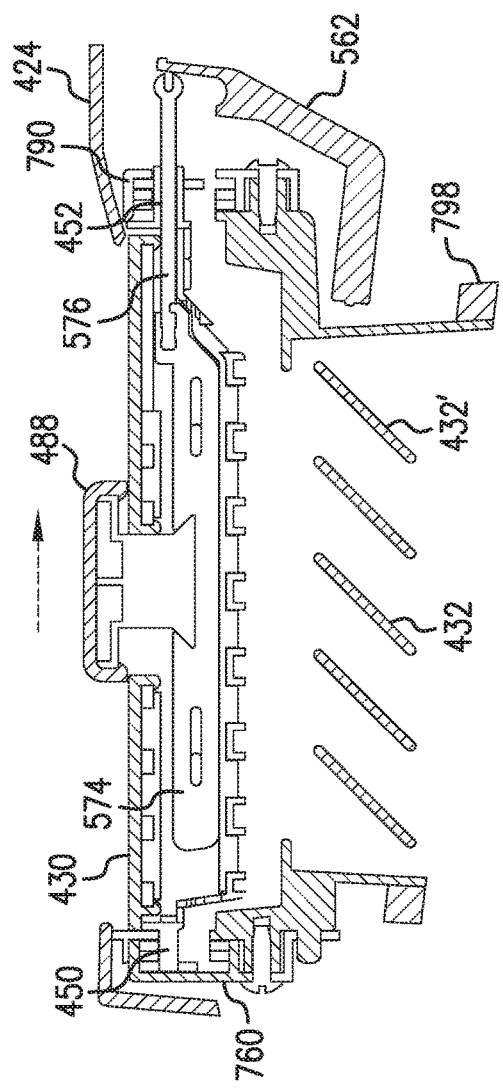
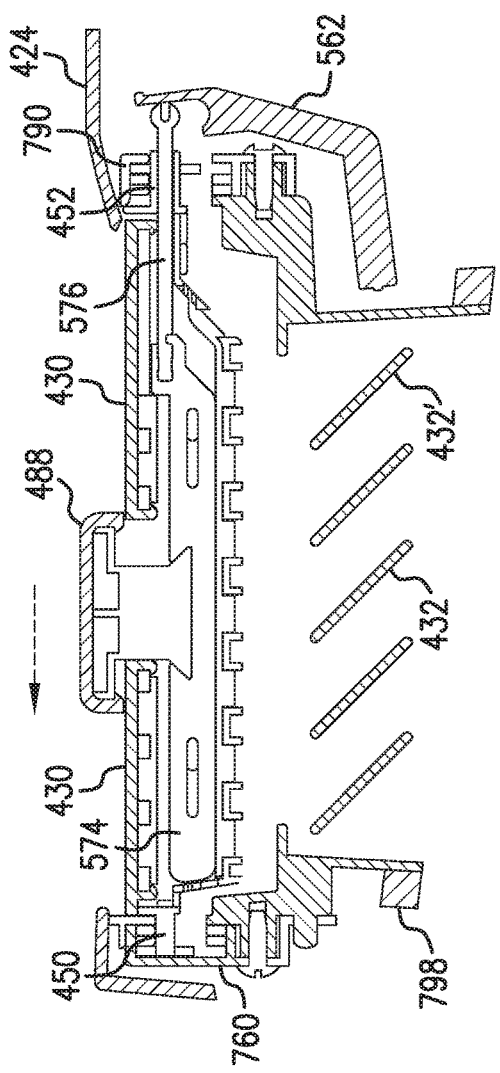
FIG.29A
FIG.29B

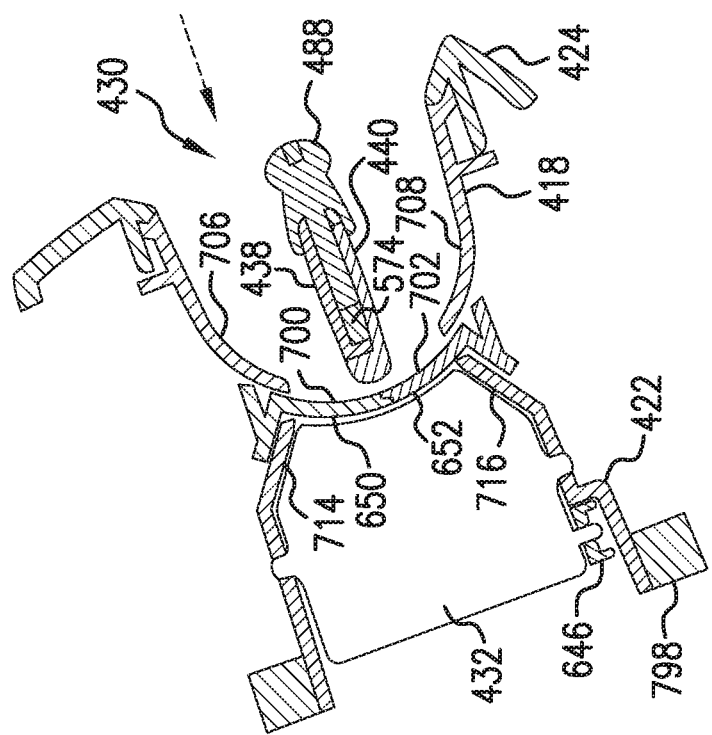
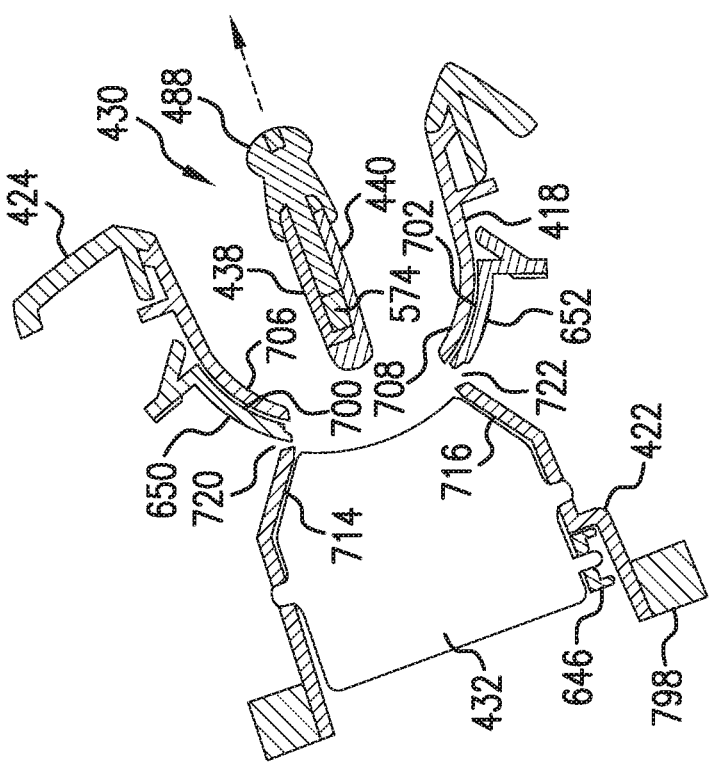

AIR VENT FOR A VEHICLE HVAC SYSTEM

BACKGROUND

HVAC systems for vehicles are increasingly complex as the demands on the degree of control of such systems increase. The vehicle HVAC system is typically connected to one or several air vents or outlets in order to discharge a flow of air within a vehicle compartment. There are many different types of air outlets and many incorporate the use of separate valves or fins that direct airflow either vertically or horizontally, and rotating dials or other mechanisms to control the positioning of the separate fins. By way of example, it is known to incorporate a set of horizontal (or vertical) fin(s) that rotate according to a rotational direction of an attached knob, a separate set of vertical (or horizontal) fin(s) that rotate according to a sliding position of the knob, and a separate shut-off valve that restricts airflow by rotating a dial which is separate from the knob. This known design is not always beneficial for packaging. Another problem with the known design is that the user is not able to see the position of the shut-off valve, and in most instances the manner to verify the position of the shut-off valve is open or close is by feeling for airflow and/or by viewing any printed or embossed indicators on the rotating dial that controls the position of the shut-off valve.

BRIEF DESCRIPTION

According to one aspect, an air vent for a vehicle HVAC system comprises a duct including an air outlet at a first end portion and an air inlet at a second end portion spaced from the first end portion in a longitudinal direction of the duct. A forward fin is connected to the first end portion and rotatable about a transverse direction of the duct. The forward fin is configured to adjust the direction of airflow in a vertical direction of the duct. A plurality of rear fins is connected to the second end portion of the duct and rotatable about the vertical direction. The plurality of rear fins is configured to adjust the direction of airflow in a longitudinal direction of the duct. A shut-off valve is rotatably connected to a central portion of the duct and positioned between the forward fin and the plurality of rear fins. The shut-off valve is directly connected to the forward fin. The shut-off valve is configured to rotate about the transverse direction between an open position and a closed position via movement of the forward fin in the longitudinal direction. The forward fin, the plurality of rear fins, and the shut-off valve are configured to rotate independently of one another.

According to another aspect, an air vent for a vehicle HVAC system comprises a duct including an air outlet at a first end portion and an air inlet at a second end portion spaced from the first end portion in a longitudinal direction of the duct. A forward fin is connected to the first end portion and rotatable about a transverse direction of the duct. The forward fin is configured to adjust the direction of airflow in a vertical direction of the duct. A plurality of rear fins is connected to the second end portion of the duct and rotatable about the vertical direction. The plurality of rear fins is configured to adjust the direction of airflow in a longitudinal direction of the duct. A shut-off valve is rotatably connected to a central portion of the duct. The shut-off valve is configured to rotate about the transverse direction between an open position and a closed position. A linkage assembly is configured to rotate the plurality of rear fins. The linkage assembly includes a first link at least partially housed in the forward fin and moveable in the transverse direction and a second link connected to the first link and at least one of the rear fins. The second link is configured to rotate about the vertical direction via the transverse movement of the first link, and rotation of the second link rotates the plurality of rear fins. The forward fin, the plurality of rear fins, and the shut-off valve are configured to rotate independently of one another.

According to another aspect, an air vent for a vehicle HVAC system comprises a duct including an air outlet at a first end portion and an air inlet at a second end portion spaced from the first end portion in a longitudinal direction of the duct. A forward fin is connected to the first end portion and rotatable about a transverse direction of the duct. The forward fin is configured to adjust the direction of airflow in a vertical direction of the duct. A plurality of rear fins is connected to the second end portion of the duct and rotatable about the vertical direction. The plurality of rear fins is configured to adjust the direction of airflow in a longitudinal direction of the duct. A shut-off valve is rotatably connected to a central portion of the duct and positioned between the forward fin and the plurality of rear fins. The shut-off valve is connected to the forward fin. The shut-off valve is configured to rotate about the transverse direction between an open position and a closed position via movement of the forward fin in the longitudinal direction. A linkage assembly is at least partially housed in the forward fin and connected to at least one of the rear fins. The linkage assembly is configured to move in the transverse direction and rotate about the vertical direction via its transverse movement, wherein rotation of the linkage assembly rotates the plurality of rear fins. The forward fin, the plurality of rear fins, and the shut-off valve are configured to rotate independently of one another.

BRIEF DESCRIPTION OF THE DRAWINGS

FIG. 5 is an exploded perspective view of the air vent of FIG. 1.

DETAILED DESCRIPTION

Figure 1:
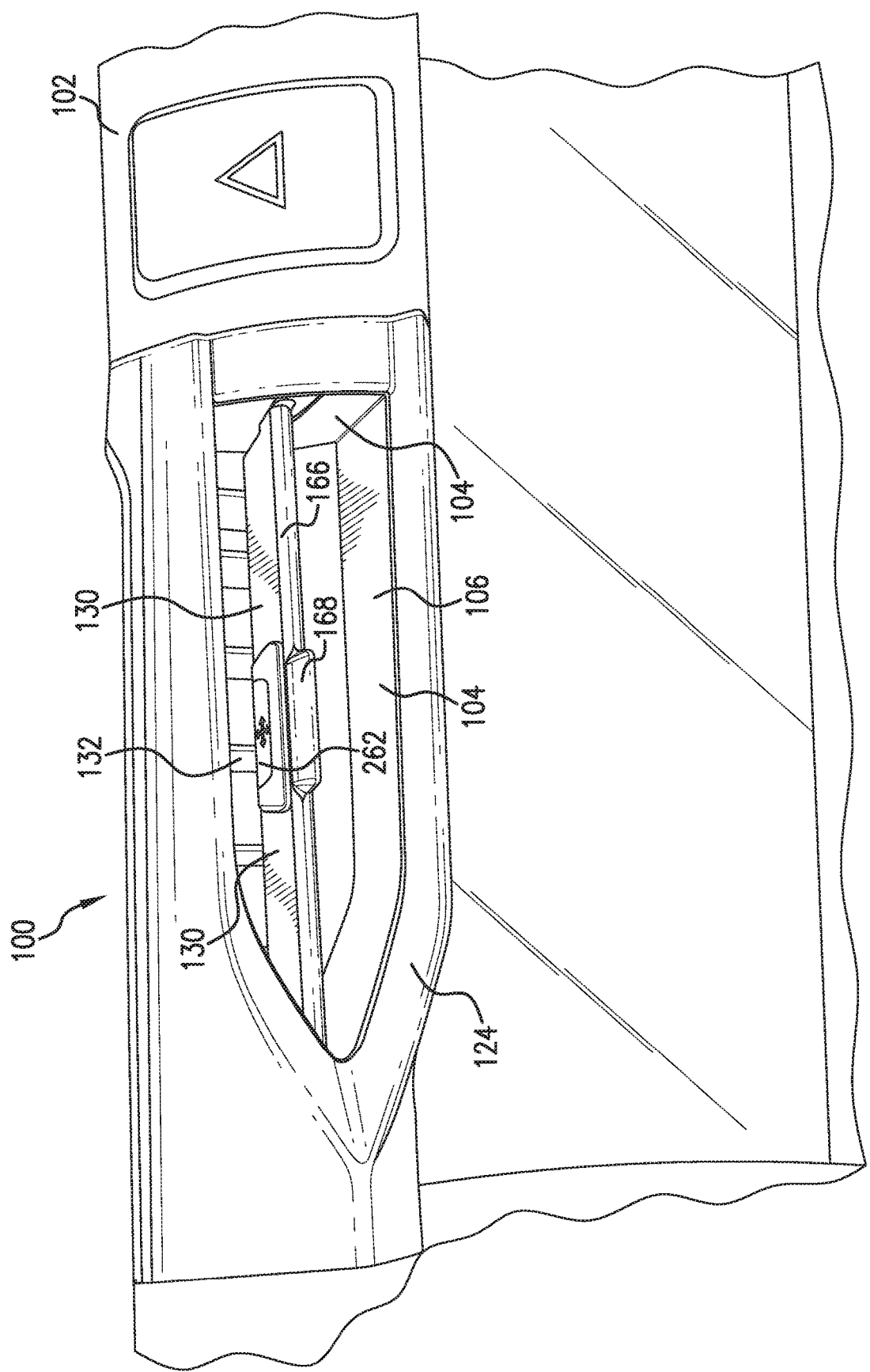
FIG. 1 is a perspective view of an air vent for a vehicle HVAC system according to one aspect of the present disclosure.
Figure 2A:
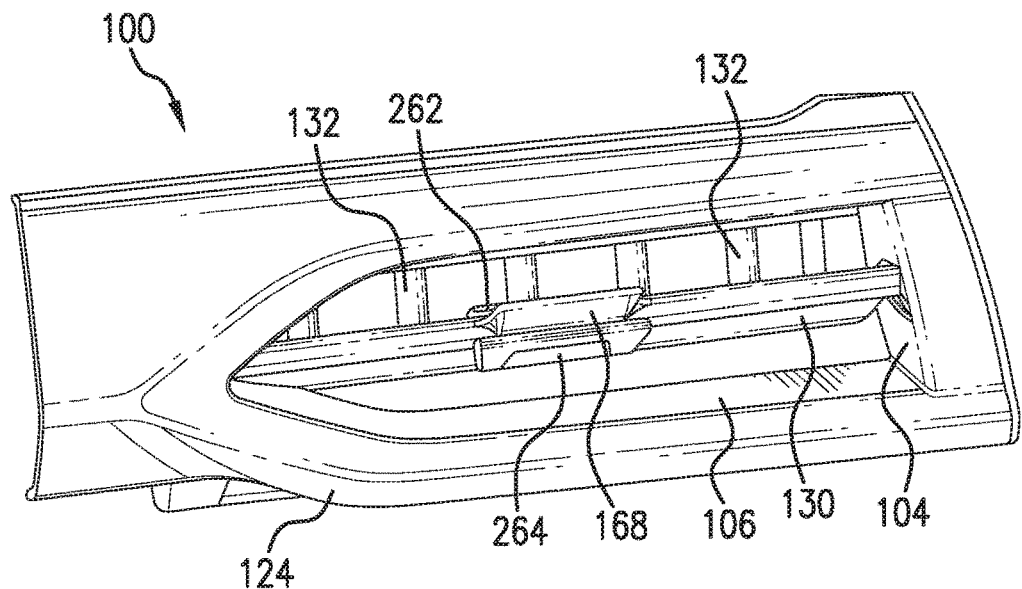
FIG. 2(*a*)-4(*b*) are perspective views of the air vent of FIG. 1 showing the various operational states of the air vent.
Figure 2B:
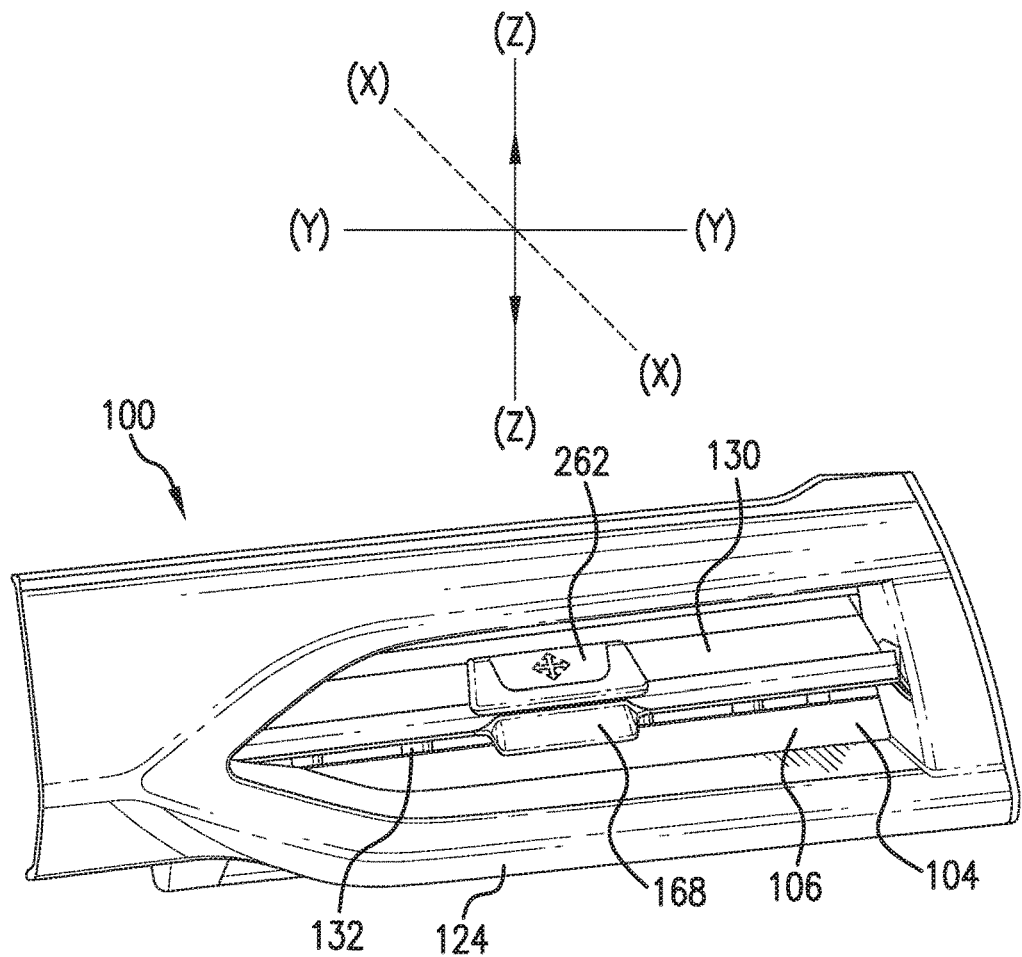
Figure 3A:
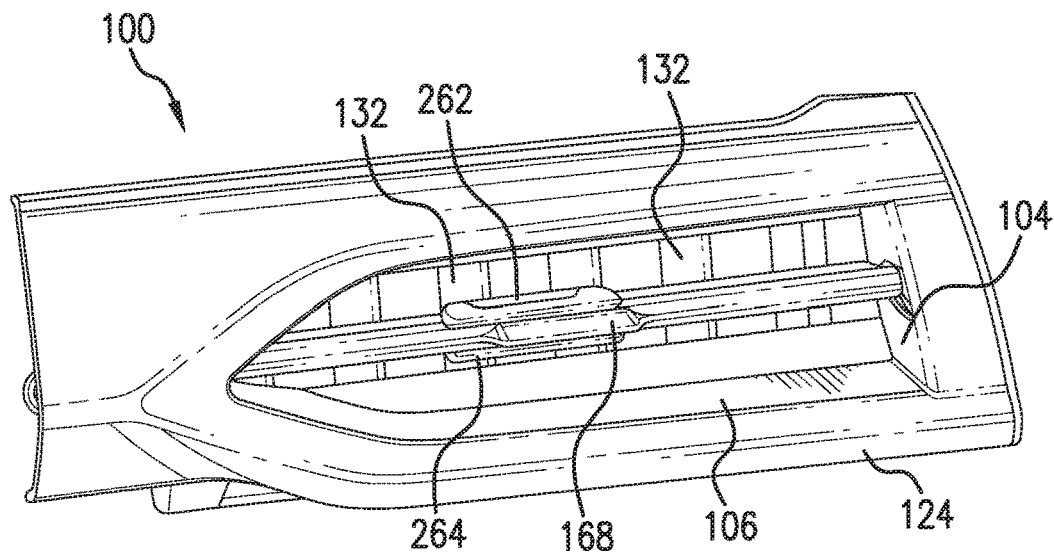
Figure 3B:
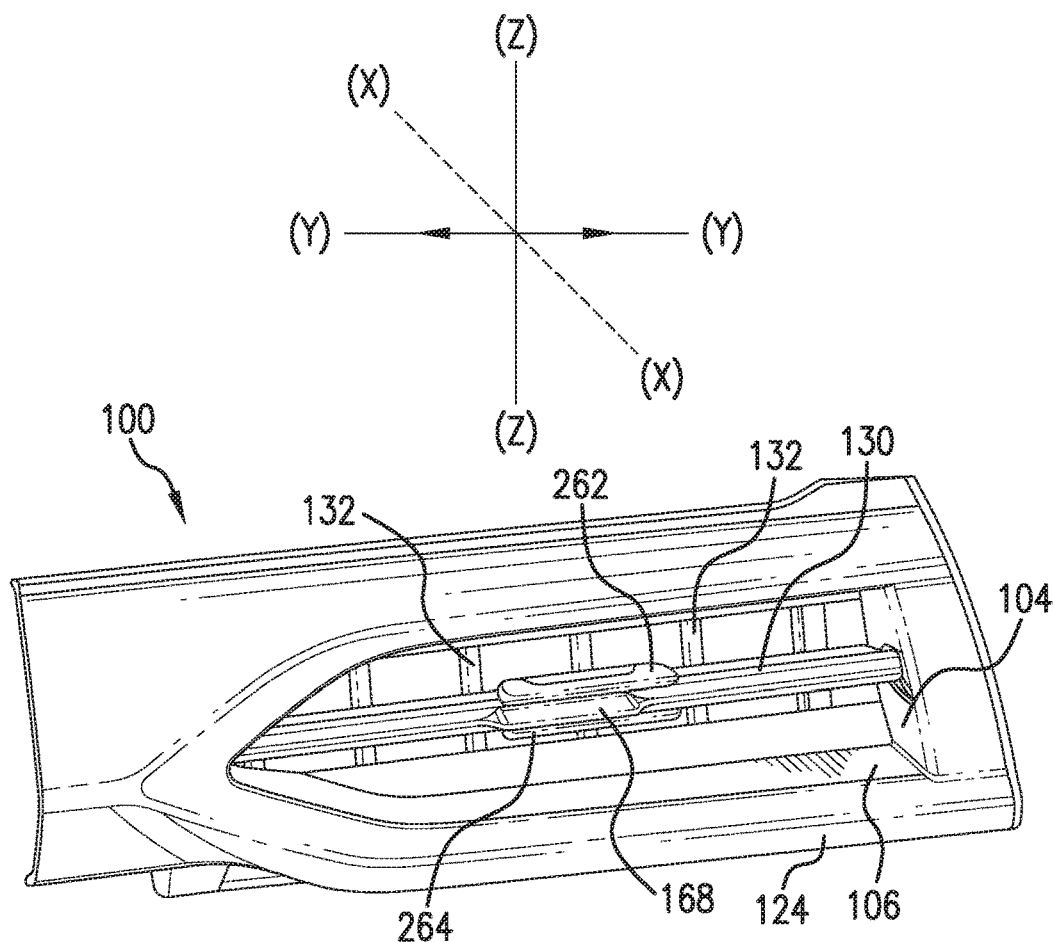
Figure 4A:
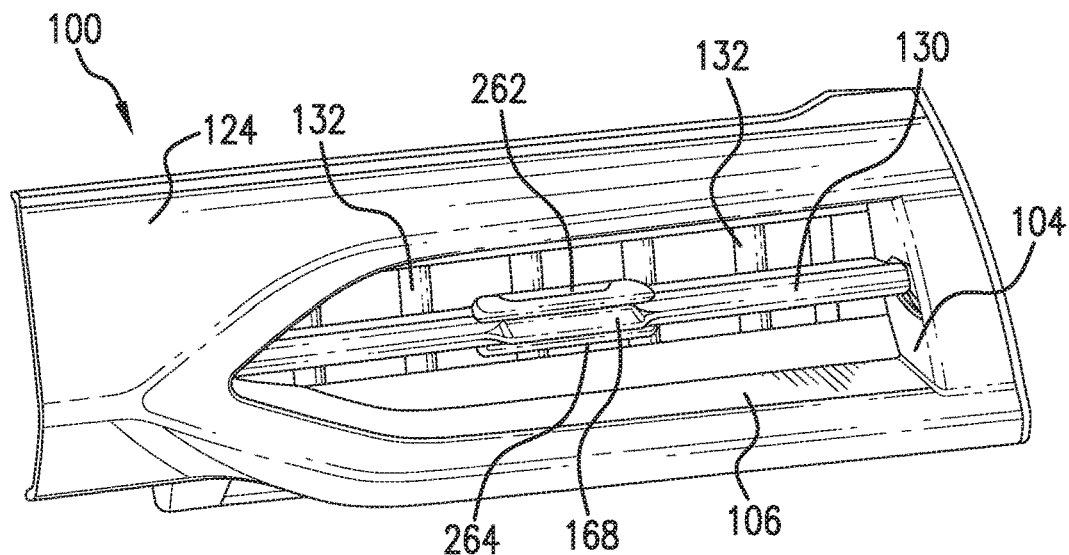
Figure 4B:
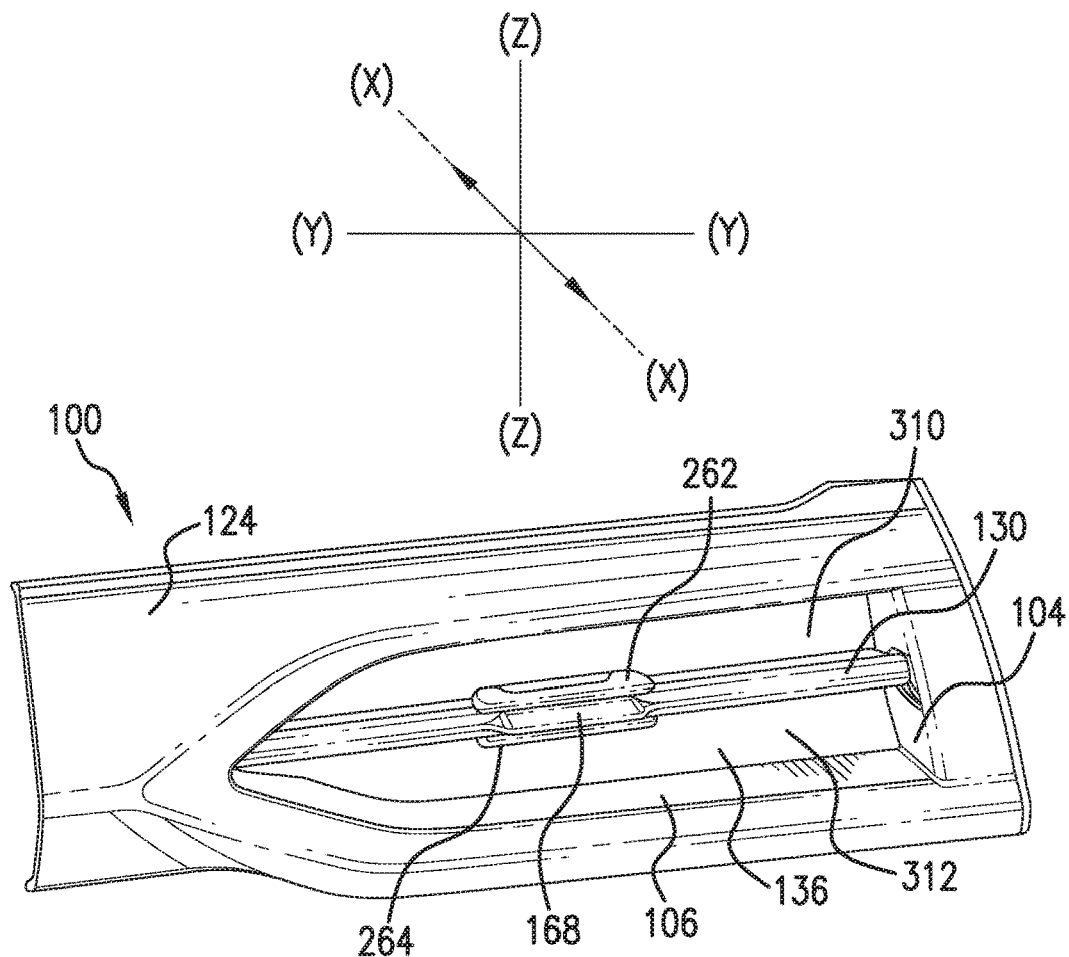

It should, of course, be understood that the description and drawings herein are merely illustrative and that various modifications and changes can be made in the structures disclosed without departing from the present disclosure. As used herein, longitudinal directions refer to forward and rearward directions of vehicle travel, transverse directions are across a width of the vehicle, i.e., left and right directions, and vertical directions relate to elevation, i.e., upward and downward directions.

Further, spatially relative term's (e.g., "forward", "rearward", "upper", "lower" and the like) may be used to describe a relationship of an element and/or a feature to another element(s) and/or feature(s) as, for example, illustrated in the drawings. It will be understood that the spatially relative terms are intended to encompass different orientations of the exemplary air vent in use and/or operation in addition to the depicted orientation. For example, if the exemplary air vent in the drawings is turned over, an element(s) described as "below" other elements or features would then be oriented "above" the other elements or features. Accordingly, the exemplary air vent may be otherwise oriented (e.g., rotated 90 degrees or at other orientations) and the spatially relative descriptors used herein interpreted accordingly.

Referring now to the drawings, wherein like numerals refer to like parts throughout the several views, FIGS. 1-5 illustrate an exemplary air vent 100 for a vehicle HVAC system according to one aspect of the present disclosure to be installed in a vehicle compartment member in the form of a dashboard or instrument panel 102. The air vent 100 is configured for distributing and directing a flow of air within the vehicle compartment. In addition, the air vent 100 is configured for regulating the level of air, as described below. The arrangement, components and functions of the dashboard (instrument panel) 102 are well-known in the art, and are therefore not further described herein. In addition, it should be appreciated that the dashboard 102 is only one example of several different vehicle compartment members, and it is therefore possible that the air vent 100 can be installed and arranged in other vehicle compartment members such as in a door trim, rear end of a floor console, B-pillar, center tunnel console or the like.

Figure 12:
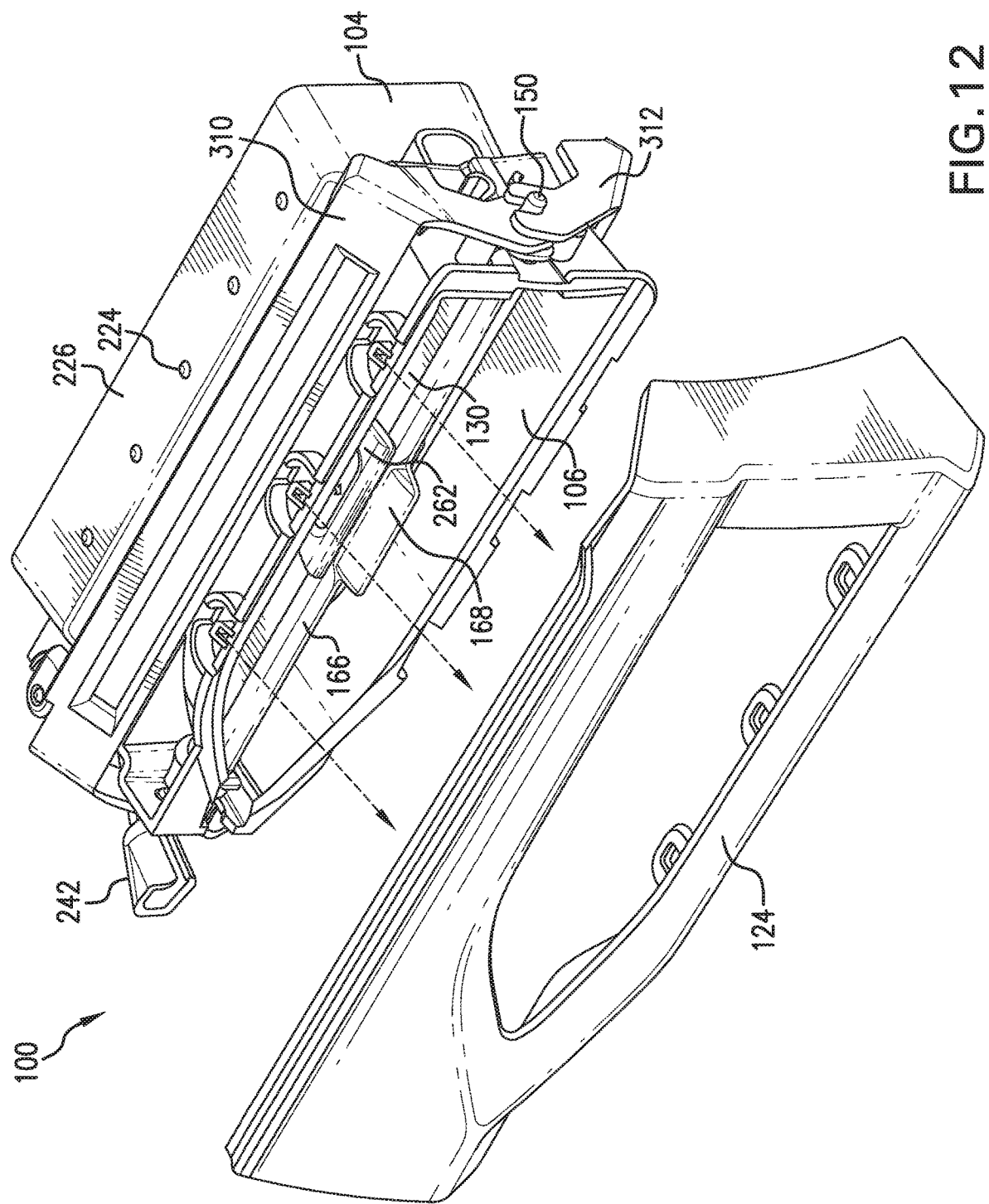
Figure 13:
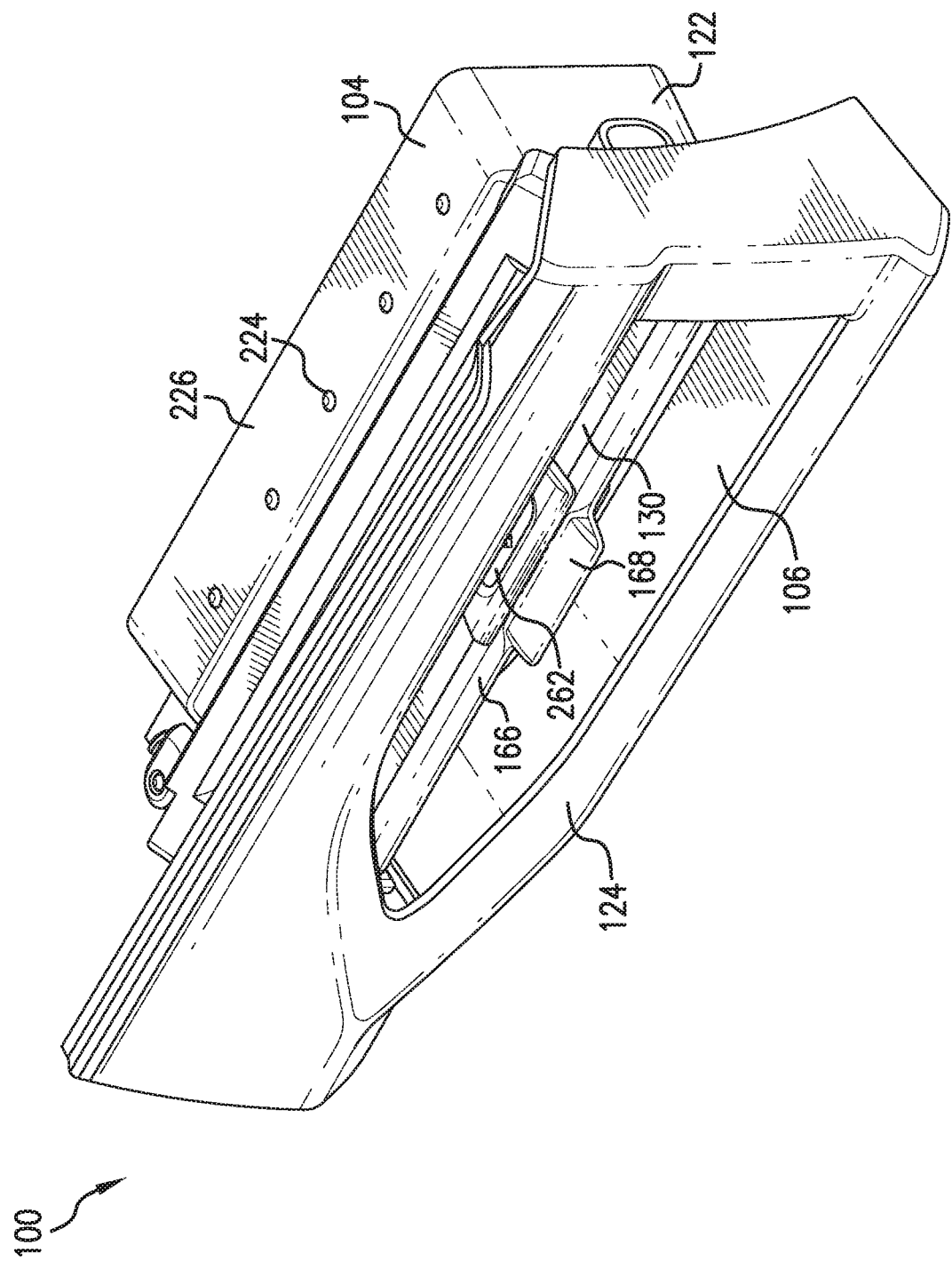

The exemplary air vent 100 includes a housing or duct 104 having an inner surface 106 extending in a longitudinal (X) direction of the duct, a transverse (Y) direction of the duct, and a vertical (Z) direction of the duct. The inner surface 106 is typically encircling at least a part of an air flow channel 108 extending through the duct 104. The duct 104 includes an air outlet 116 at a first end portion 118 and an air inlet 120 at a second end portion 122 spaced from the first end portion 118 in a longitudinal direction of the duct 104. The air flow channel 108 through the duct 104 transports a flow of air between the air inlet 120 and the air outlet 116. As is well known, the air inlet 120 is typically connected to an air duct of the vehicle HVAC system. Accordingly, the air inlet 120 is arranged upstream of the air outlet 116, as seen in the longitudinal direction. In other words, the air outlet 116 is arranged downstream of the air inlet 120, as seen in a longitudinal direction. A garnish 124 can be connected to the first end portion 118 of the duct 104 (FIGS. 12 and 13).

A forward fin 130 is connected to the first end portion 118 and rotatable about the transverse direction of the duct 104. The forward fin 130 is configured to adjust the direction of airflow in the vertical direction of the duct 104. A plurality of rear fins 132 is connected to the second end portion 122 of the duct 104 and rotatable about the vertical direction. The plurality of rear fins 132 is configured to adjust the direction of airflow in the longitudinal direction of the duct 104. A shut-off valve 136 is rotatably connected to a central portion 138 of the duct 104 and positioned between the forward fin 130 and the plurality of rear fins 132. The shut-off valve 136 is directly connected to the forward fin 130 and is configured to rotate about the transverse direction between an open position and a closed position via movement of the forward fin 130 in the longitudinal direction. As will be appreciated, the forward fin 130, the plurality of rear fins 132, and the shut-off valve 136 are configured to rotate independently of one another. In this context of the present disclosure, the term "independently" typically refers to the principle that one component (e.g. the forward fin 130) can be maintained in its position when another component (e.g. the plurality of rear fins 132 and/or the shut-off valve 136) is adjusted.

Figure 6:
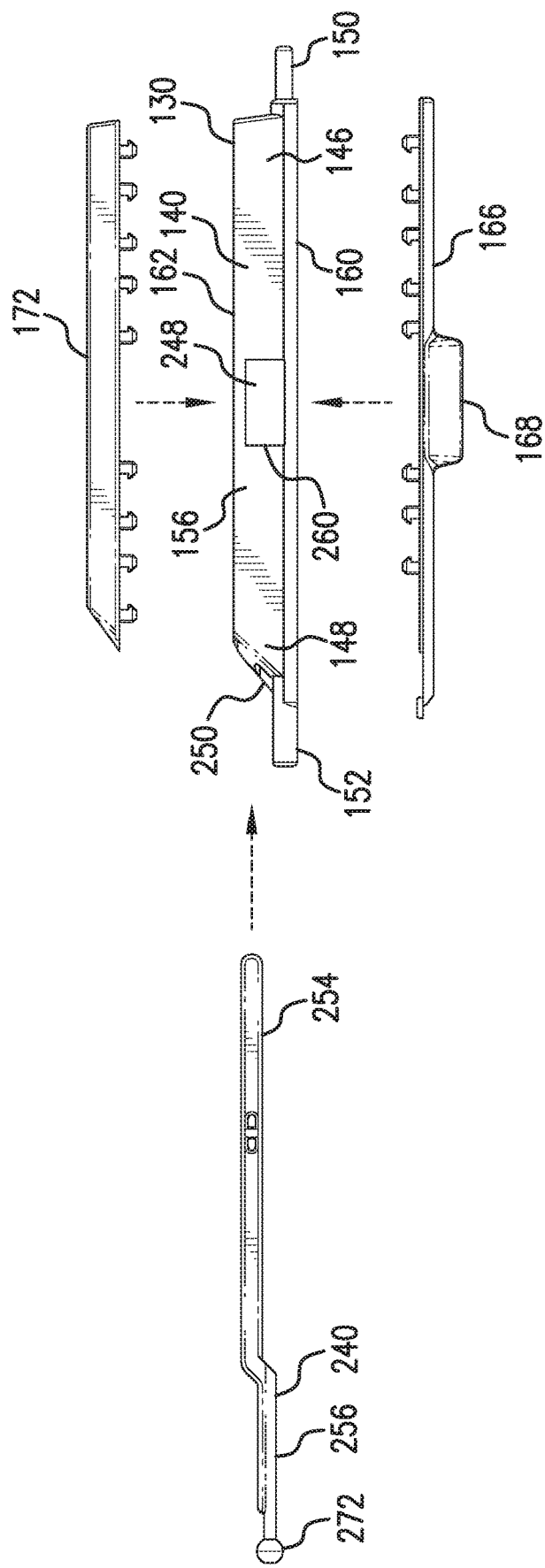
FIGS. 6-13 are perspective views illustrating an assembly of the air vent of FIG. 1.
Figure 7:
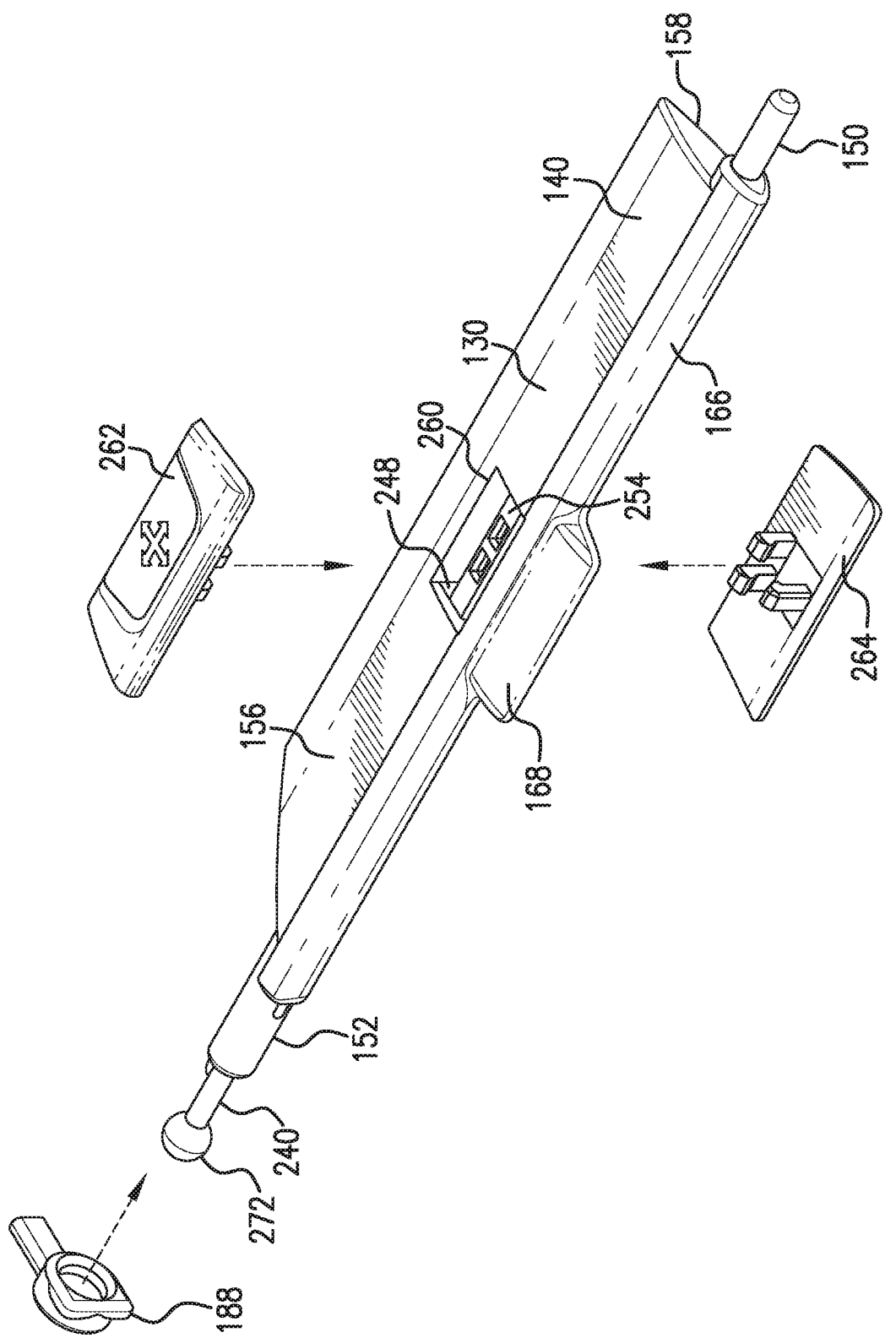
Figure 9:
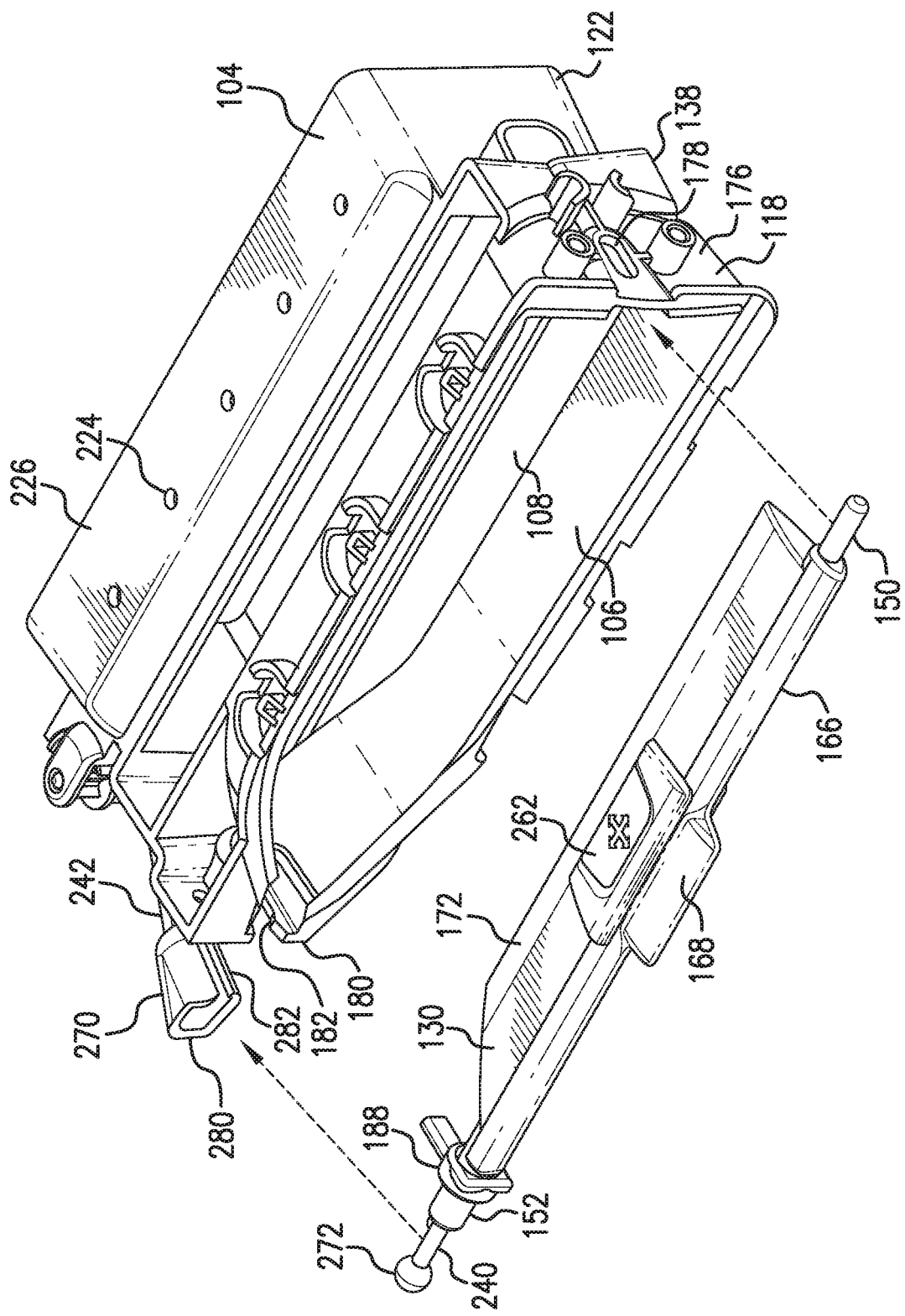

In the depicted aspect of FIGS. 6 and 7, the forward fin 130 includes a body 140 having a first end portion 146 and a second end portion 148 spaced from the first end portion in the transverse direction of the duct 104. A first pin 150 projects from the first end portion 146 and a second pin 152 projects from the second end portion 148. The body 140 of the forward fin 130 further includes an upper surface 156, a lower surface 158 opposite the upper surface, a forward end portion 160, and a rear end portion 162 spaced from the forward end portion in the longitudinal direction of the duct 104. A forward insert 166 can be connected to the forward end portion 160, and a knob 168 can be connected to the forward insert 166. Although, it should be appreciated that the knob 168 can be directly connected to the forward end portion 160. A rear insert 172 can be connected to the rear end portion 162, and as shown, the rear insert is generally triangular shaped in cross section. Accordingly, it should be appreciated that with the forward and rear inserts 166, 172 connected to the body 140, the forward fin 130 is generally airfoil shaped. As will be appreciated, the forward and rear inserts 166, 172 allow for ease of assembly of the air vent 100; however, according to another aspect, one of the forward insert 166 and the rear insert 172 can be integral with the body 140, and according to another aspect, the forward fin 130 can be a unitary part. As shown in FIG. 9, to assemble the forward fin 130 to the first end portion 118 of the duct 104, a first sidewall 176 of the duct 104 includes a first slot 178 sized to receive the first pin 150 and a second sidewall 180 of the duct 104 includes a second slot 182 sized to receive the second pin 152. A first spacer 186 can be secured to that portion of the first pin 150 extending outwardly from the first sidewall 176, and a second spacer 188 can be secured to that portion of the second pin 152 extending outwardly from the second sidewall 180.

Figure 10:
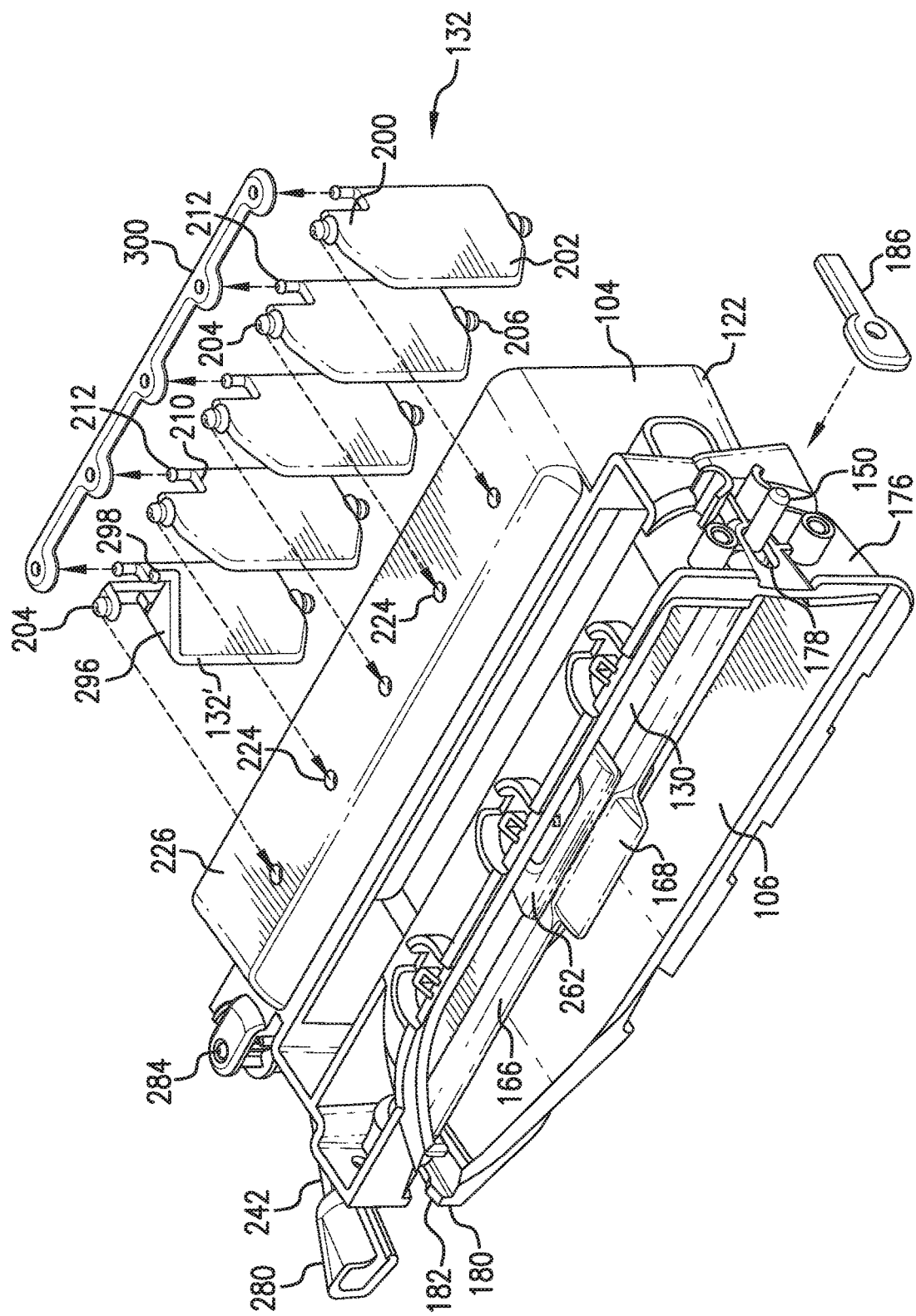

With reference to FIGS. 5 and 10, each of the plurality of rear fins 132, which can be similarly shaped, includes an upper end portion 200 and a lower end portion 202 spaced from the upper end portion in the vertical direction of the duct 104. An upper pin 204 projects from the upper end portion 200 and a lower pin 206 projects from the lower end portion 202. In the depicted aspect, a step portion 210 is provided on the upper end portion 200 and a connecting pin 212 for connection to a part of a linkage assembly 220 extends from the step portion 210 in the same direction as the upper pin 204. As depicted, to assemble the plurality of rear fins 132 to the second end portion 122 of the duct 104, the upper pins 204 are received in corresponding openings 224 provided on an upper wall 226 of the duct 104, and the lower pins 206 are received in corresponding openings 228 provided on an lower wall 230 of the duct 104. It should be appreciated that when assembled, the upper and lower pins 204, 206 together define the rotational axes for the plurality of rear fins 132.

FIGS. 5-10 depict the linkage assembly 220 according to the present disclosure which is configured to rotate the plurality of rear fins 132. The linkage assembly 220 includes a first link 240 moveable in the transverse direction of the duct 104 and a second link 242 connected to the first link 240 and at least one of the rear fins 132. The second link 242 is configured to rotate about the vertical direction of the duct 104 via the transverse movement of the first link 240, and rotation of the second link rotates the plurality of rear fins 132. According to one aspect, the linkage assembly 220 can be at least partially housed in the forward fin 130, which provides a compact assembly of the air vent 100. As shown, the body 140 of the forward fin 130 can define a cavity 248 elongated in the transverse direction, and the first link 240 is slidably received in the cavity 248. The second end portion 148 of the body 140 includes an access opening 250 for the cavity 248. The first link 240 can include a first section 254 and a second section 256 offset in the longitudinal direction from the first section. The first link 240 is slid through the access opening 250 and into the cavity 248, with the first section received in the cavity 248 and the second section 256 at least partially projecting from the second end portion 148 of the body 140. In the depicted aspect, the second pin 152 can include a slotted opening (not shown) which receives at least part of the second section 256 wherein the second section 256 extends coaxially with the second pin 152. The upper surface 156 of the forward fin 130 has a cutout 260 extending into the cavity 248 and exposing a portion of the first section 254 of the first link 240 received in the cavity 248. A knob 262 is slidably received in the cutout 260 and is connected to that exposed portion of the first link 240. It should be appreciated that the lower surface 158 of the forward fin can also have a cutout (not shown) extending into the cavity 248 which is aligned with the cutout 260. A lower knob 264 can be slidably received in this lower cutout and can be connected to the first link 240.

The second link 242 of the linkage assembly 220 can include a first arm 270 connected to an end portion 272 of the first link 240 and a second arm 276 connected to the at least one rear fin 132. In the depicted aspect, the first arm 270 generally extends in the longitudinal direction of the duct 104 and the second arm 276 generally extends in the transverse direction of the duct 104. Allowing for the independent movement of forward fin 130 and the plurality of rear fins 132, the connection of the first arm 270 with the end portion 272 of the first link 240 is adapted so that rotation of the first link 240 about the transverse direction of the duct 104 (via rotation of the forward fin 130) does not cause corresponding rotation of the second link 242 about the vertical direction of the duct 104. According to one embodiment, the end portion 272 of the first link 240 is received in a housing 280 provided on the first arm 270. The housing 280 is configured to allow for rotation of the end portion 272 while maintaining the connection of the end portion 272 with the first arm 270. In the illustrated aspect, the housing 280 includes a slot 282 sized to receive the second section 256 of the first link 240, and the end portion 272 of the first link 240 is spherical shaped. The spherical shaped end portion 272 of the first link 240 rotates in the housing 280 as the forward fin 130 is rotated about the transverse direction without corresponding rotation of the second link 242. And with the spherical shaped end portion 272 received in the housing 280, the connection of the end portion 272 of the first link 240 with the first arm 270 is secured as the first link 240 is moved in the transverse direction of the duct 104.

Figure 8:
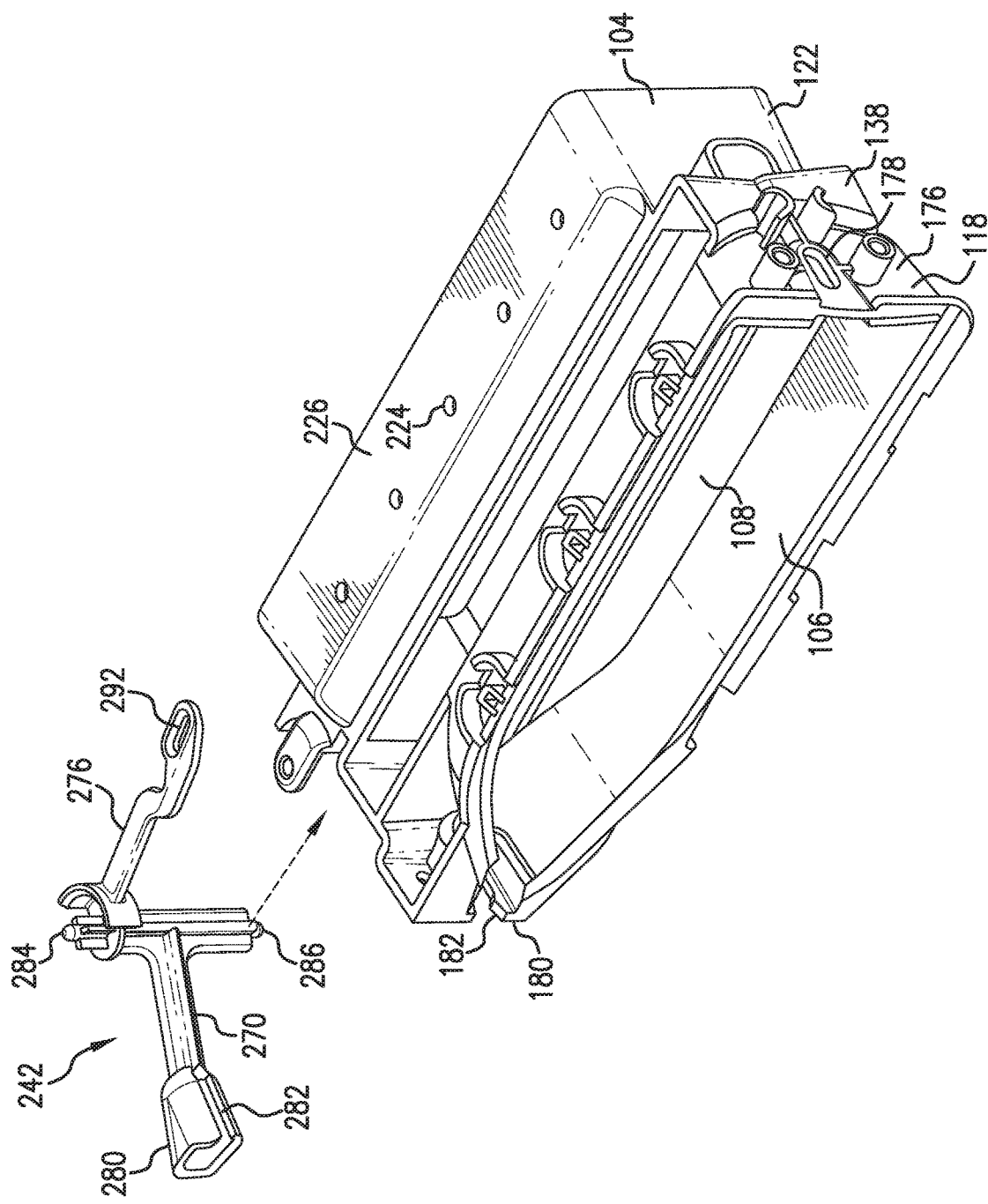
Figure 14:
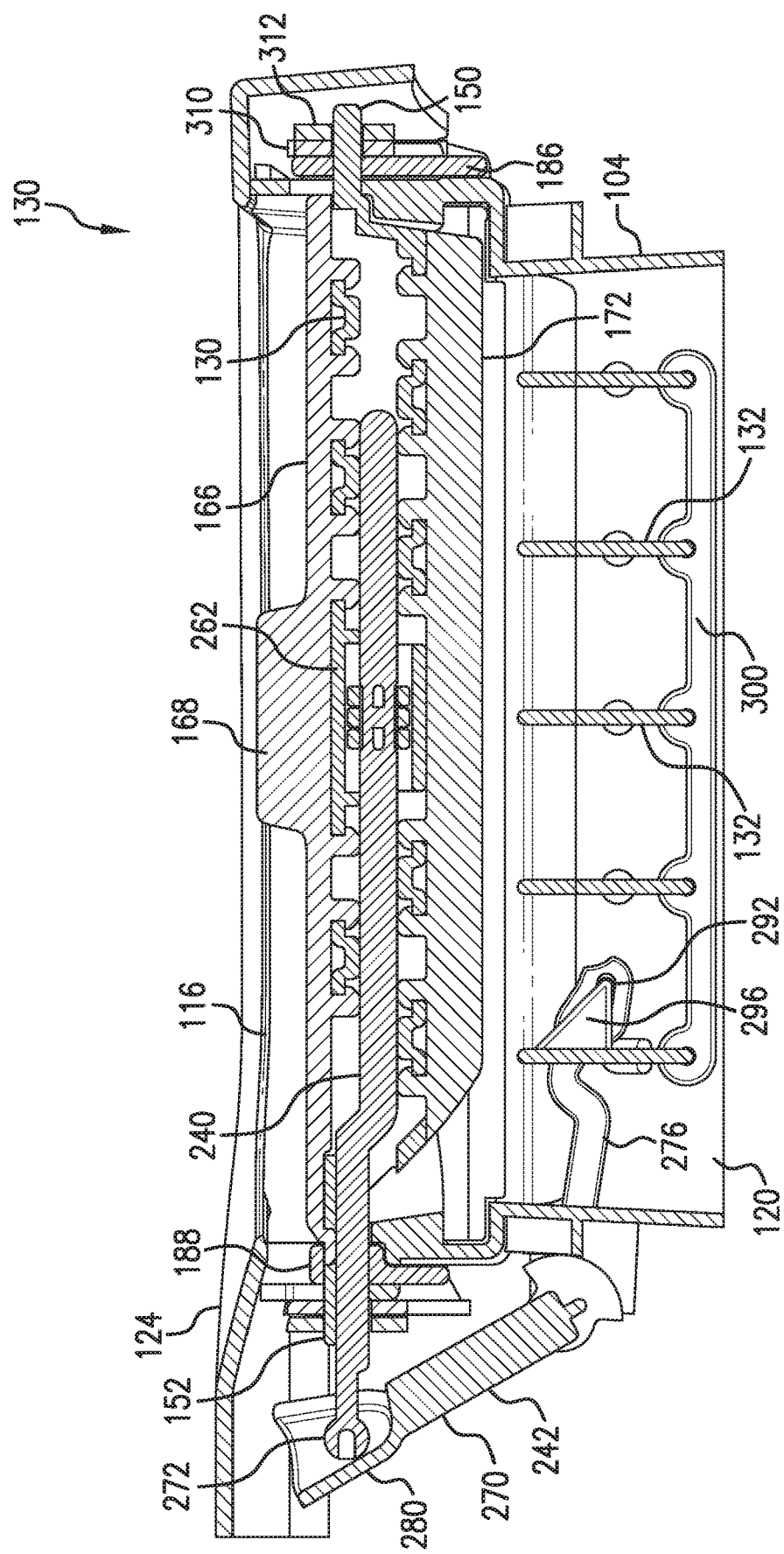
FIGS. 14 and 15 are cross-sectional views of the air vent of FIG. 13.

With continued reference to FIGS. 8-10, the second link 242 is located outside the second sidewall 180 of the duct 104 and is rotatably connected to the duct via pins 284, 286 which snap into corresponding holes (only hole 288 is visible) provided on the duct 104, the pins 284, 286 defining a rotational axis for the second link 242. The second arm 276 of the second link 242 extends through an opening (not shown) on the second sidewall 180 of the duct 104 and is connected to that one rear fin 132' closest to the second sidewall 180. According to one aspect, a distal end of the second arm 276 includes a slot 292. The rear fin 132' can include a platform 296 for supporting the distal end of the second arm 276, and further includes a secondary pin 298 which is slidably received in the slot 292 (FIG. 14). The linkage assembly 220 further includes a third link 300 having openings 302 sized to receive the connecting pins 212 of the rear fins 132. Therefore, the third link 300 interconnects the plurality of rear fins 132. It should be appreciated that rotation of the second link 242 causes the secondary pin 298 to move within the slot 292, and this, in turn, causes rotation of the plurality of rear fins 132.

Figure 11:
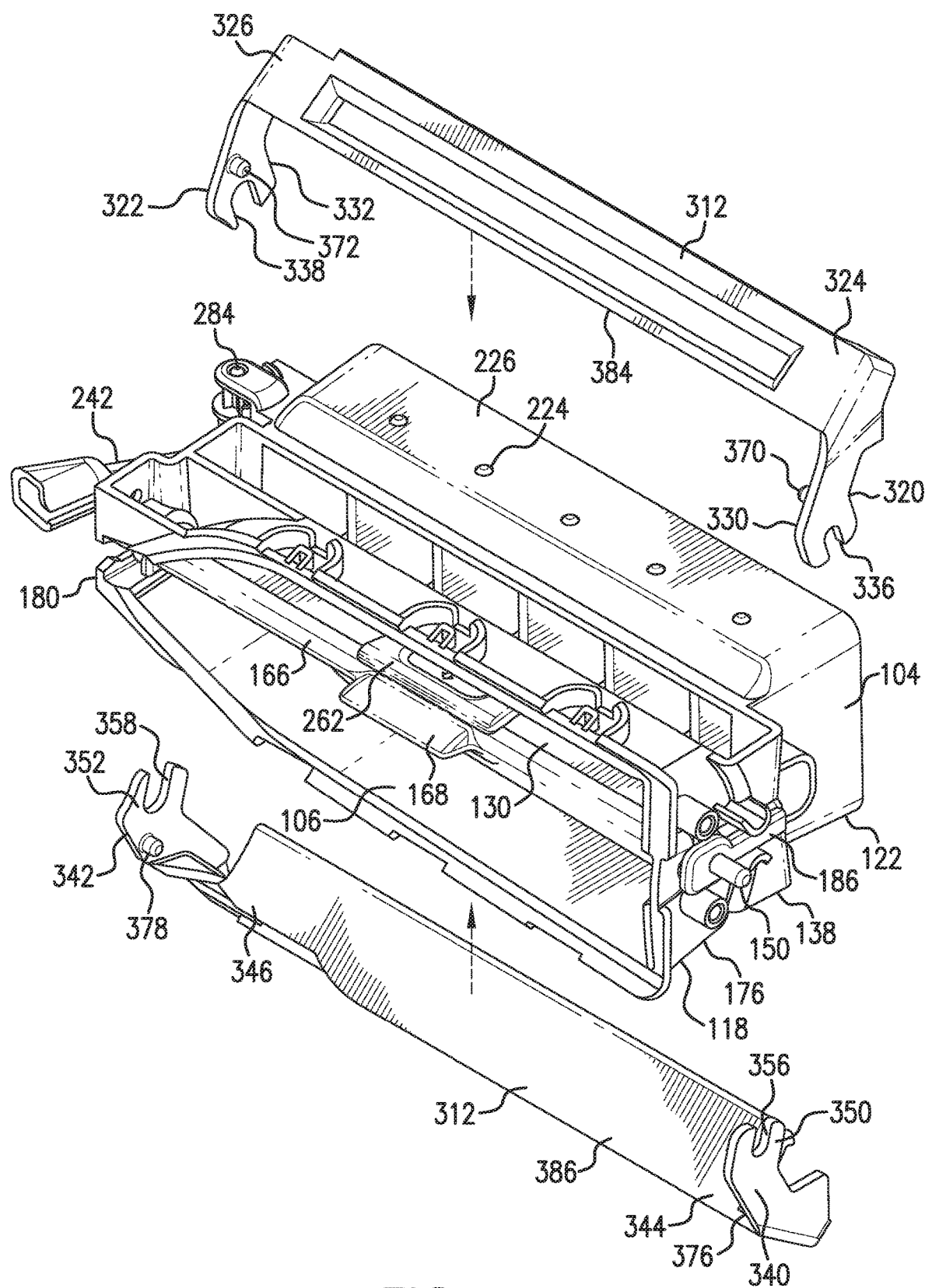

As indicated previously, and as depicted in FIGS. 5 and 11, the shut-off valve 136 is rotatably connected to the central portion 138 of the duct 104 and positioned between the forward fin 130 and the plurality of rear fins 132. The shut-off valve 136 is directly connected to the forward fin 130 and is configured to rotate about the transverse direction between an open position and a closed position via movement of the forward fin in the longitudinal direction. According to one aspect, the shut-off valve 136 is defined by a first valve 310 and a second valve 312 each rotatably connected to the first and second sidewalls 176, 180 of the duct 104, and movement of the shut-off valve 136 toward the closed position rotates the first and second valves 310, 312 toward one another. As described above, the forward fin 130 includes the first axial pin 150 slidably received in the first slotted opening 178 located on the first sidewall 176 and the second axial pin 152 slidably received in the second slotted opening 182. The first valve 310 includes extensions 320, 322 located at opposite end portions 324, 326, and end portions 330, 332 of the respective extensions 320, 322 are configured to receive the first and second pins 150, 152. By way of example, the end portions 330, 332 can include slots 336, 338 sized to receive the first and second pins 150, 152. Similarly, the second valve 312 includes extensions 340, 342 located at opposite end portions 344, 346, and end portions 350, 352 of the respective extensions 340, 342 also include slots 356, 358 sized to receive the first and second pins 150, 152.

Figure 15:
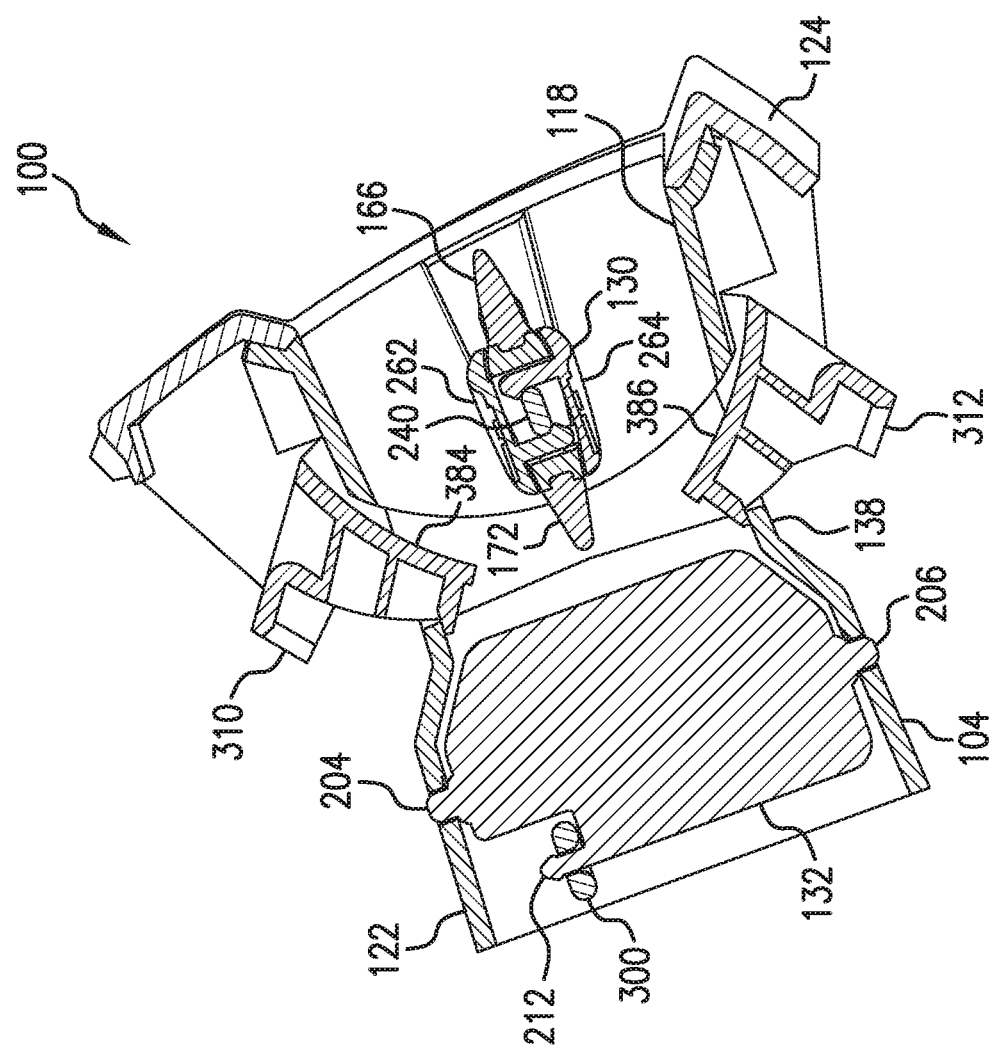

Further, the rotational connection of each of the first valve 310 and second valve 312 is offset in the vertical direction from the connection of their respective extensions to the first and second axial pins 150, 152. As depicted in FIG. 11, pins 370, 372 on inner surfaces of the respective extensions 320, 322 of the first valve 310 fit within corresponding holes located in the first and second sidewalls 176, 180 of the duct 104 and define the axis of rotation for the first valve 310. Like the first valve 310, pins 376, 378 on inner surfaces of the respective extensions 340, 342 of the second valve 312 fit within corresponding holes also located in the first and second sidewalls 176, 180 of the duct 104 and define the axis of rotation for the second valve 312. According to the present embodiment of FIG. 15, each of the first valve 310 and the second valve 312 in the open position of the shut-off valve 136 defines a ramped surface 384, 386 that directs airflow toward the forward fin 130. It should be appreciated that felt or foam may be applied to edges of the first and second valves 310, 312 where the valves meet in the closed position of the shut-off valve 136 to reduce noise and help ensure airflow though the duct 104 is sealed off.

As is evident from the forgoing, the operation of the exemplary air vent 100 is simplified for the user. Every function of the air vent 100 may be operated by the forward fin 130. The forward fin 130 may be rotated about the transverse direction of the duct 104 (FIGS. 2(a) and 2(b)) and translated in the longitudinal direction of the duct 104 to move the shut-off valve 136 (FIGS. 4(a) and 4(b)), and the knob 262, 264 of the forward fin 130 may be translated in transverse direction to rotate the plurality of rear fins 132 (FIGS. 3(a) and 3(b)). With the central location of the shut-off valve 136, the user can visibly see the open/close position of the shut-off valve 136, so no printed or embossed indicators are needed, except what might be placed on the knob.

Figure 16:
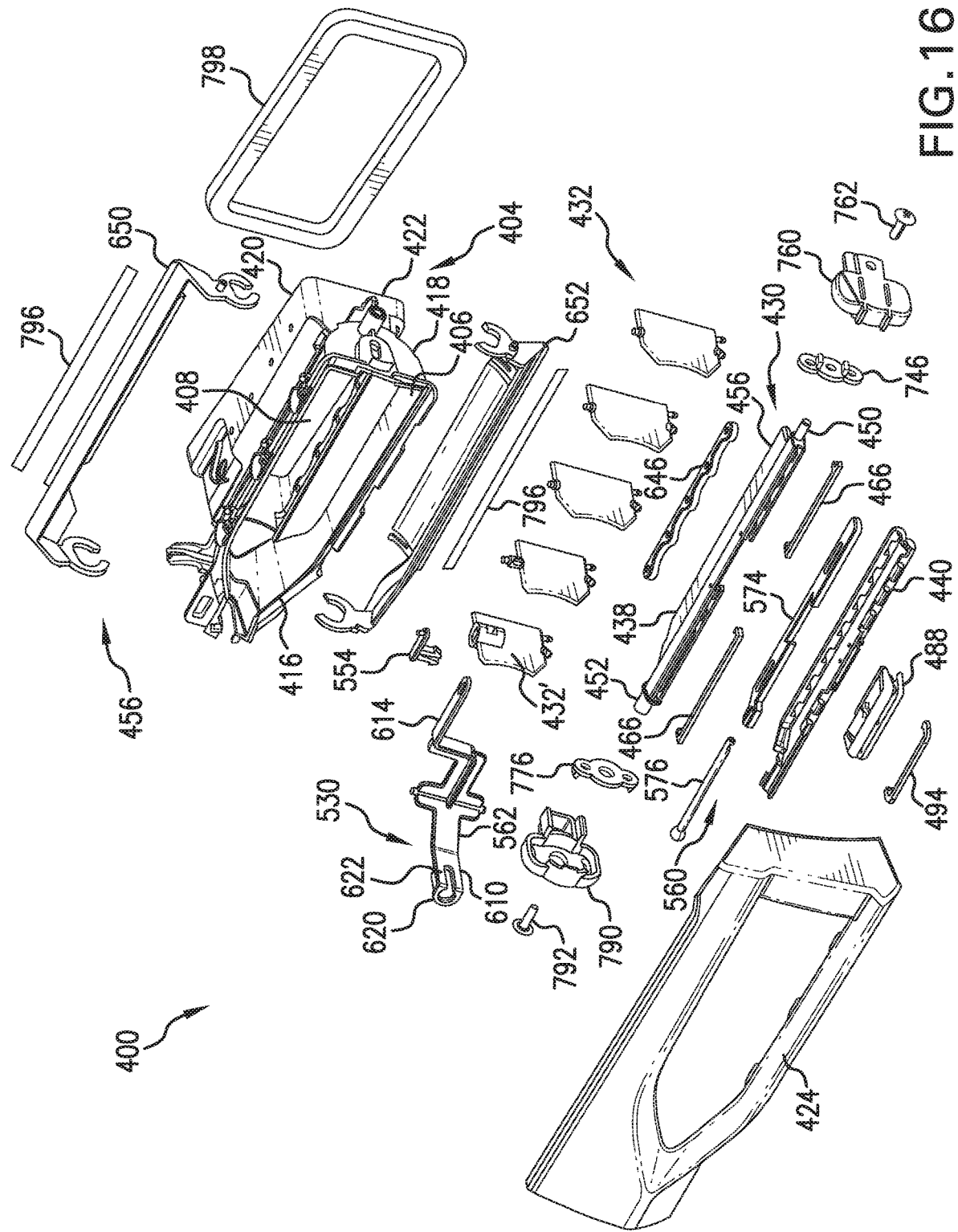
FIG. 16 is an exploded perspective view of an air vent according to another aspect of the present disclosure.

FIG. 16 illustrates an exemplary air vent 400 for a vehicle HVAC system according to another aspect of the present disclosure to be installed in a vehicle compartment member. Similar to the air vent 100 described in detail above, the air vent 400 is configured for distributing and directing a flow of air within the vehicle compartment, and regulating the level of air, as described below. The exemplary air vent 400 includes a housing or duct 404 having an inner surface 406 extending in a longitudinal (X) direction of the duct, a transverse (Y) direction of the duct, and a vertical (Z) direction of the duct. The inner surface 406 is typically encircling at least a part of an air flow channel 408 extending through the duct 404. The duct 404 includes an air outlet 416 at a first end portion 418 and an air inlet 420 at a second end portion 422 spaced from the first end portion 418 in a longitudinal direction of the duct 404. The air flow channel 408 through the duct 404 transports a flow of air between the air inlet 420 and the air outlet 416. A garnish 424 can be connected to the first end portion 418 of the duct 404.

A forward fin 430 is connected to the first end portion 418 and rotatable about the transverse direction of the duct 404. The forward fin 430 is configured to adjust the direction of airflow in the vertical direction of the duct 404. A plurality of rear fins 432 is connected to the second end portion 422 of the duct 404 and rotatable about the vertical direction. The plurality of rear fins 432 is configured to adjust the direction of airflow in the longitudinal direction of the duct 404. A shut-off valve 436 is rotatably connected to a central portion of the duct 404 and positioned between the forward fin 430 and the plurality of rear fins 432. The shut-off valve 436 is directly connected to the forward fin 430 and is configured to rotate about the transverse direction between an open position and a closed position via movement of the forward fin 430 in the longitudinal direction. Again, as will be appreciated, the forward fin 430, the plurality of rear fins 432, and the shut-off valve 436 are configured to rotate independently of one another.

Figure 17:
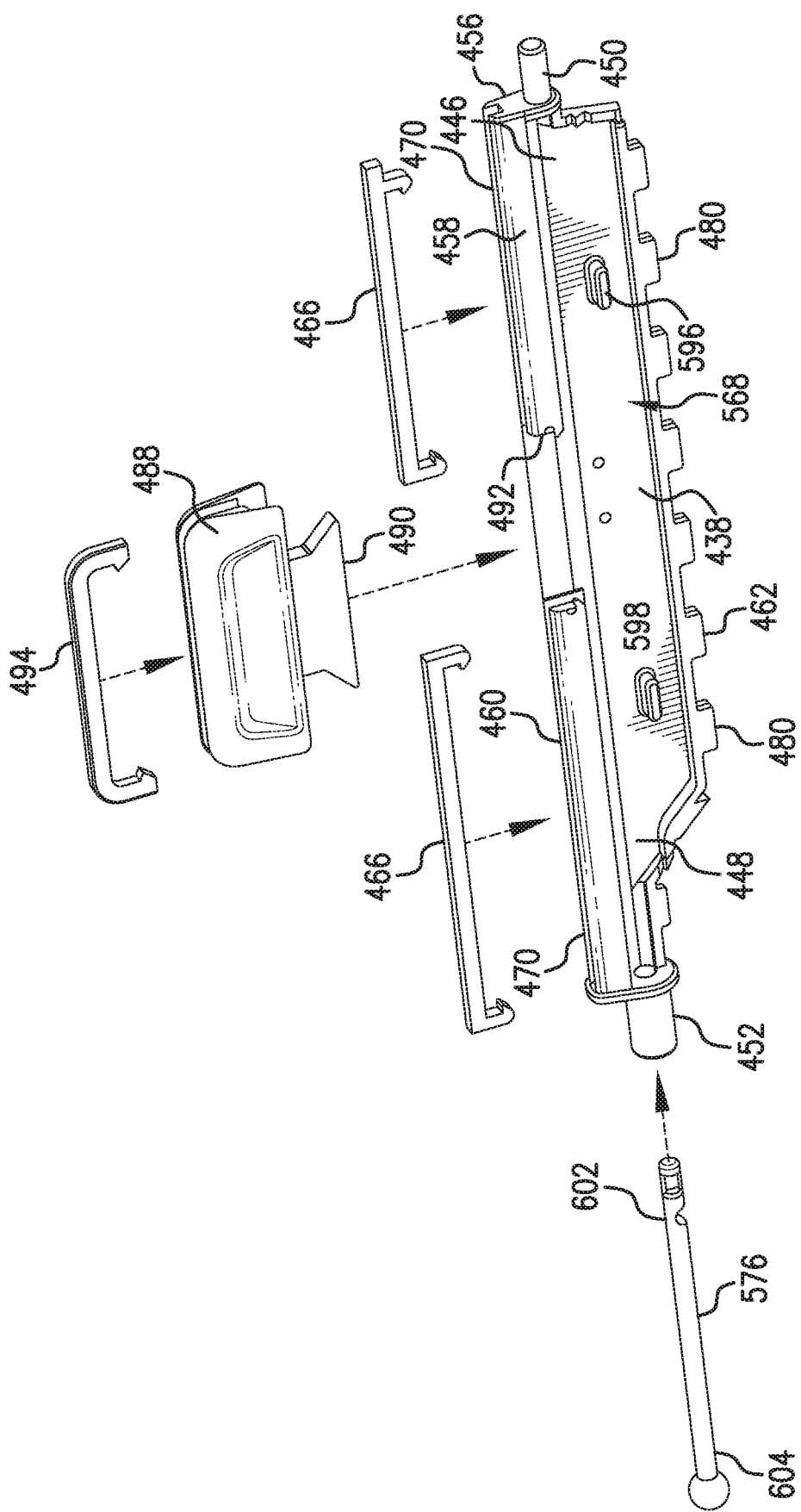
FIGS. 17-27 are perspective views illustrating an assembly of the air vent of FIG. 16.
Figure 18:
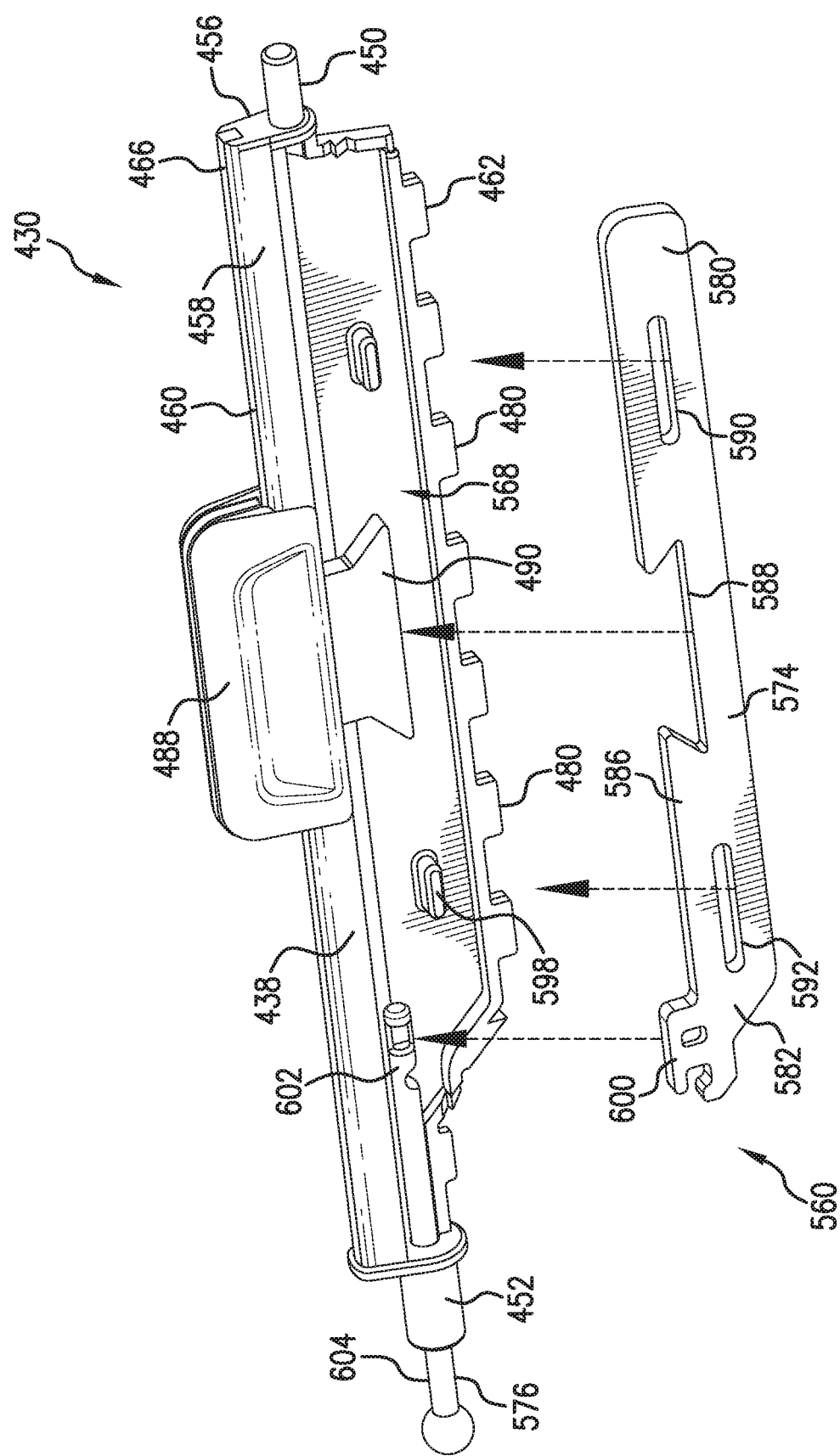
Figure 19:
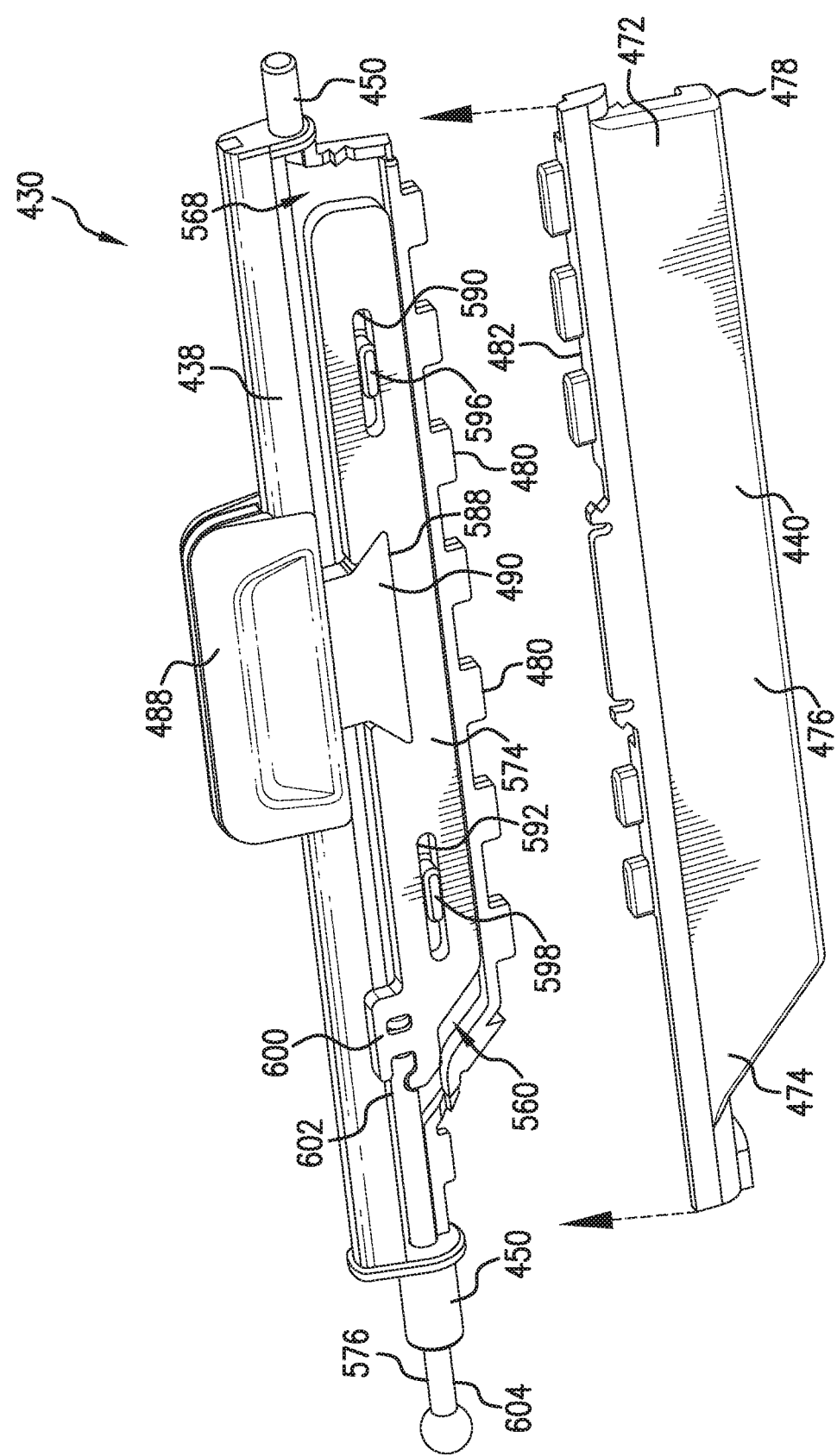

In the depicted aspect of FIG. 17, the forward fin 430 is defined by an upper part 438 and a lower part 440 connected to the upper part 438. The upper part 438 has a first end portion 446 and a second end portion 448 spaced from the first end portion in the transverse direction of the duct 404. A first pin 450 projects from the first end portion 446 and a second pin 452 projects from the second end portion 448. The upper part 438 of the forward fin 430 further includes an upper surface 456, a lower surface 458 opposite the upper surface, a forward end portion 460, and a rear end portion 462 spaced from the forward end portion in the longitudinal direction of the duct 404. A pair of forward inserts 466 can be connected to the forward end portion 460. As depicted, the forward end portion 460 includes a pair of spaced channels 470 sized to receive the pair of forward inserts 466. As shown in FIG. 19, the lower part 440 of the forward fin 430 includes a first end portion 472, a second end portion 474, and a lower surface 476. A rear end portion 478 of the lower part 440 is configured to engage and cover the rear end portion 462 of the upper part 438. As shown, the rear end portion 462 can be provided with spaced tabs 480 which in the assembled condition of the forward fin 430 are received in spaced openings (not shown) in the rear end portion 478.

Figure 20:
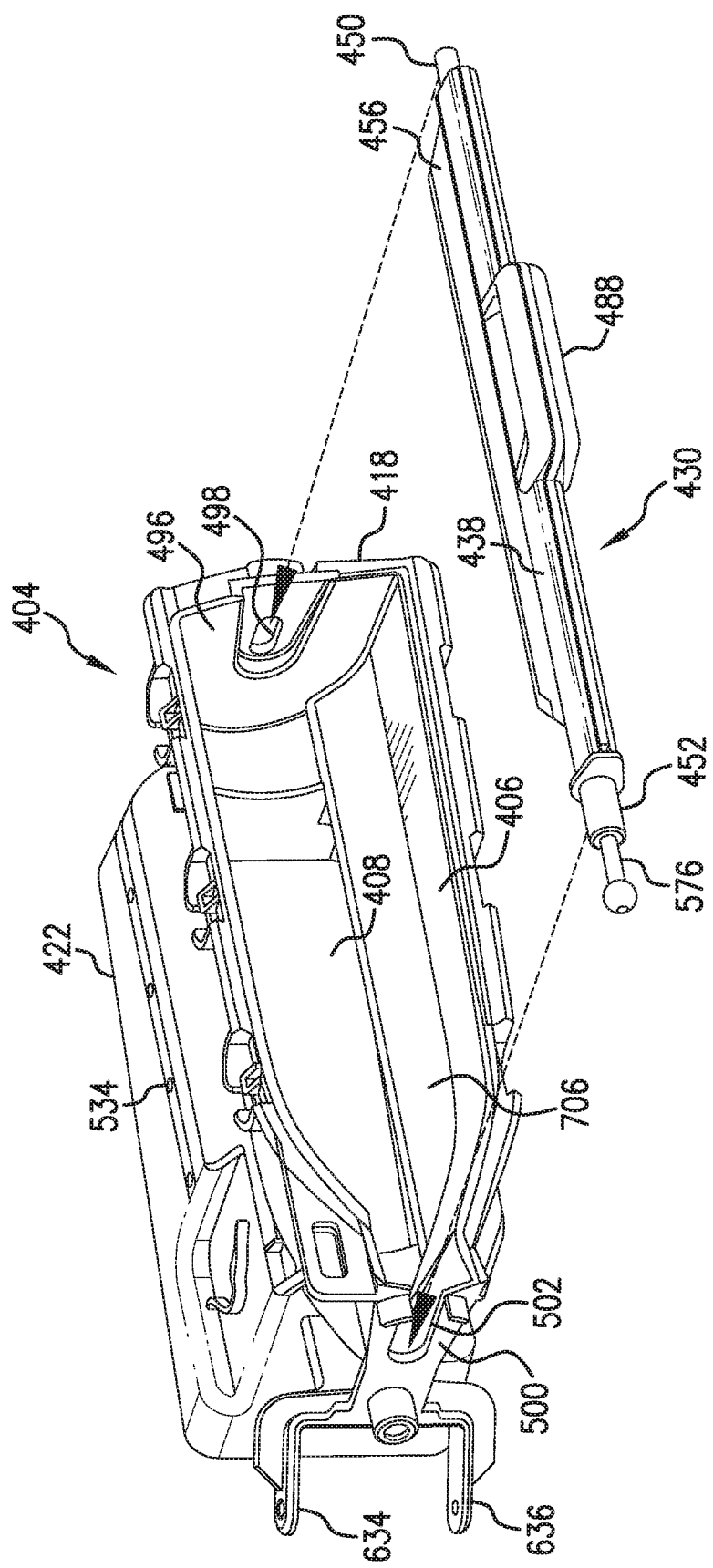

A forward end portion 482 of the lower part 440 can include spaced tabs 486 which in the assembled condition of the forward fin 430 are received in spaced openings (not shown) in the forward end portion 460 of the upper part 438. Accordingly, it should be appreciated that with the upper and lower parts 438, 440 of the forward fin 430 connected to one another, the forward fin 430 is generally airfoil shaped. Further, an operational knob 488 is connected to the forward fin 430. According to the depicted embodiment, the knob 488 includes a wedge-shaped engagement member 490 which is received in a cutout 492 located in the forward end portion 460 of the upper part 438. A trim 494 is connected to the knob 488. As depicted in FIG. 20, to assemble the forward fin 430 to the first end portion 418 of the duct 404, a first sidewall 496 of the first end portion 418 of the duct 404 includes a first slot 498 sized to receive the first pin 450, and a second sidewall 500 of the first end portion 418 of the duct 404 includes a second slot 502 sized to receive the second pin 452.

Figure 24:
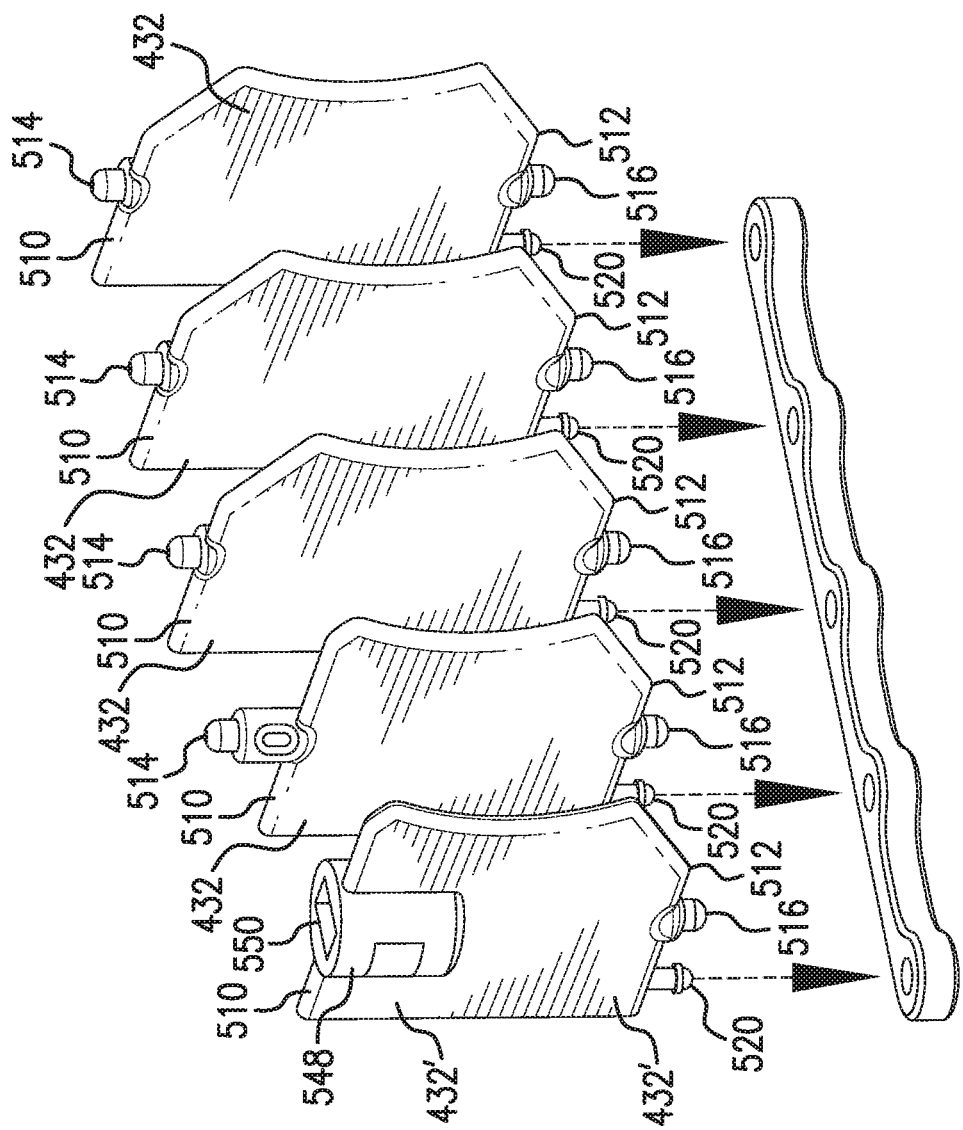
Figure 25:
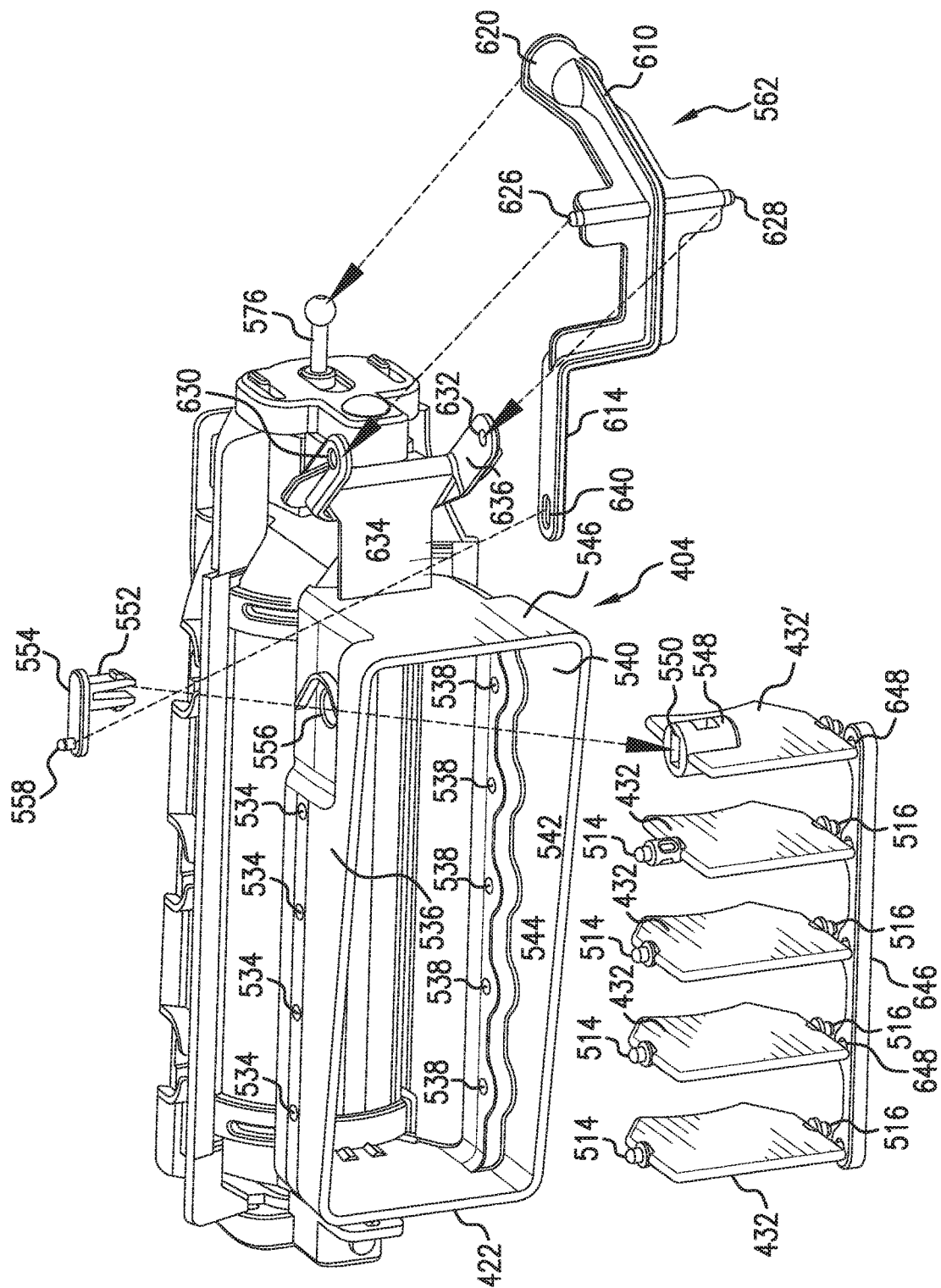
Figure 26:
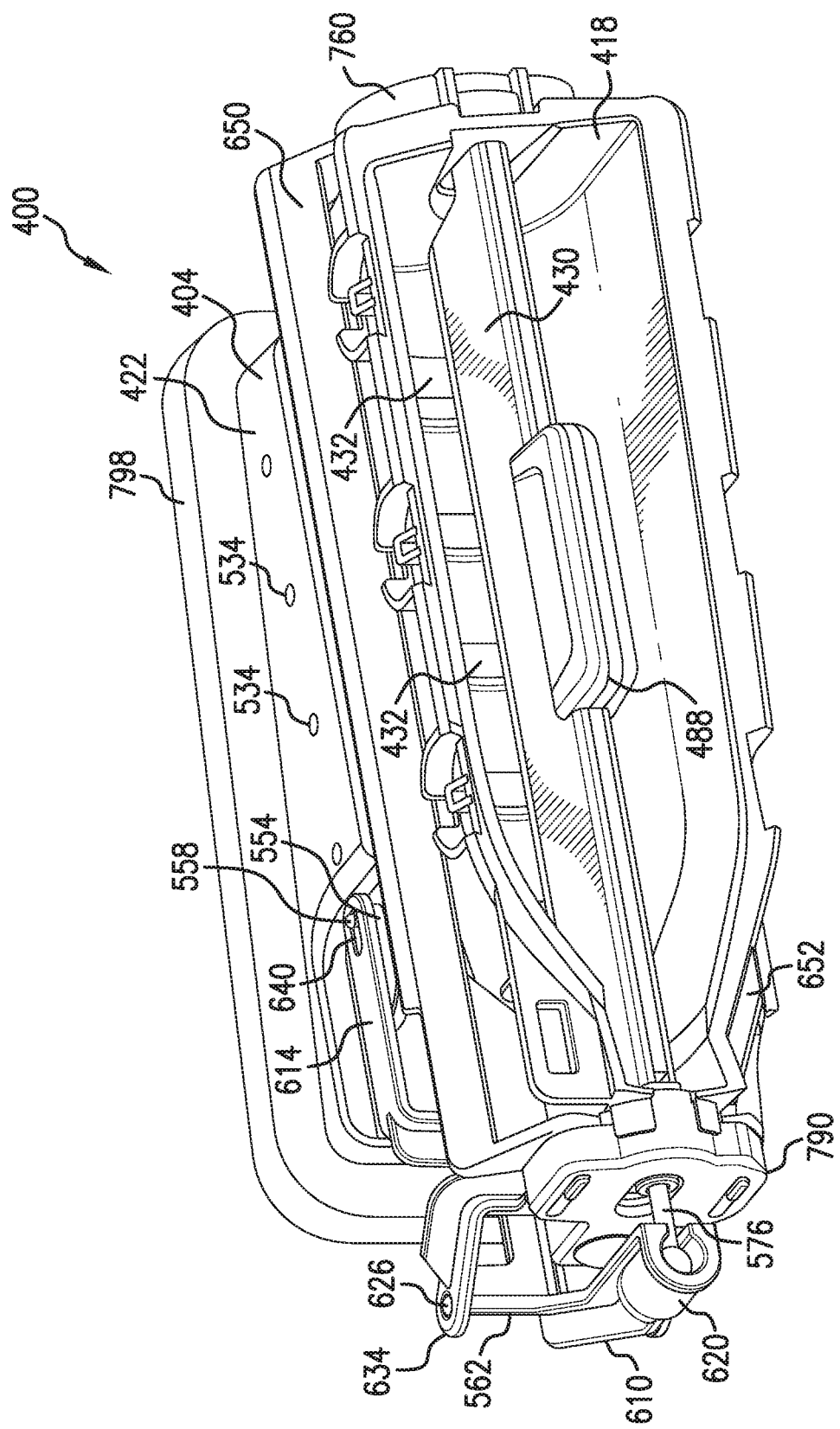

With reference to FIGS. 24 and 25, each of the plurality of rear fins 432, which can be similarly shaped, includes an upper end portion 510 and a lower end portion 512 spaced from the upper end portion in the vertical direction of the duct 404. An upper pin 514 projects from the upper end portion 510 and a lower pin 516 projects from the lower end portion 512. In the depicted aspect, provided on the lower end portion 512 of each rear fin 432 is a connecting pin 520 for connection to a linkage assembly 530 which extends in the same direction as the lower pin 516. As illustrated, to assemble the plurality of rear fins 432 to the second end portion 422 of the duct 404, the upper pins 514 are received in corresponding openings 534 provided on an upper wall 536 of the duct 404, and the lower pins 516 are received in corresponding openings 538 provided on an lower wall 540 of the duct 404. In the depicted aspect, the lower wall 540 can include a platform 542 having a contoured (for example, sinusoidal shaped) rear end portion 544 which mates with a part of the linkage assembly 530. Further, according to one aspect, the rear fin 432' closest to a first sidewall 546 of the second end portion 422 of the duct 404 includes a boss 548 having an opening 550 sized to releasably receive prongs 552 extending from a clip 554. The clip 554 is secured to the upper wall 536 of the duct 404, and the prongs 552 extend through a hole 556 in the upper wall 536 into engagement with the rear fin 432'. Another part of the linkage assembly 530 engages a pin 558 provided on the clip 554. It should be appreciated that when assembled, the upper and lower pins 514, 516 together define the rotational axes for the plurality of rear fins 432.

FIGS. 16-19 and 25 best depict the linkage assembly 530 according to the present disclosure which is configured to rotate the plurality of rear fins 432. The linkage assembly 530 includes a first link 560 moveable in the transverse direction of the duct 404 and a second link 562 connected to the first link 560 and at least one of the rear fins 432. The second link 562 is configured to rotate about the vertical direction of the duct 404 via the transverse movement of the first link 560, and rotation of the second link rotates the plurality of rear fins 432. According to one aspect, the linkage assembly 530 can be at least partially housed in the forward fin 430, which provides a compact assembly of the air vent 400. As shown, the forward fin 430 can define a cavity 568 elongated in the transverse direction, and the first link 560 is slidably received in the cavity 568. According to one embodiment, the first link 560 can include a first section 574 and a second section 576 separate from and connected to the first section. In the illustrated aspect, the first section 574 includes a first end portion 580, a second end portion 582, and a forward edge portion 586. A cutout 588 shaped for the wedge-shaped engagement member 490 is centrally provided on the forward edge portion 586. First and second slots 590, 592 which are elongated in the transverse direction are located on the respective first and second end portions 580, 582. The first and second slots 590, 592 are sized to receive first and second tabs 596, 598 located in the cavity 568 of the forward fin 430. An engagement feature 600 is provided on the second end portion 582 of the first section 574 for engaging the second section 576. The second section 576 includes a first end portion 602 configured to mate with the engagement feature 600 and a second end portion 604.

To assemble the first link 560 to the forward fin 430, the knob 488 is first mounted to the forward fin 430 with the wedge-shaped engagement member 490 extended through the cutout 492 into the cavity 568. The first end portion 602 of the second section 576 is threaded through the second pin 452 wherein the second end portion 604 extends coaxially with the second pin 452. The first section 574 is then placed in the cavity 568 with the first and second tabs 596, 598 received in the respective first and second slots 590, 592 and the wedge-shaped engagement member 490 received in the correspondingly shaped cutout 588. It should be appreciated the wedge-shaped engagement member 490 received in the cutout 588 defines a dovetail joint to maintain connection between the knob 488 and the first link 560. The engagement feature 600 mates with first end portion 602 of the second section 576. With the disclosed arrangement, the knob 488 is slidably received in the cutout 492 with its travel distance in the transverse direction being limited by the sliding movement of first section 574 relative to the first and second tabs 596, 598 within the first and second slots 590, 592.

With reference to FIGS. 16 and 25, the second link 562 of the linkage assembly 530 can include a first arm 610 connected to an end portion of the first link 560 (i.e., the second end portion 604 of the second section 576 of the first link 560) and a second arm 614 connected to the at least one rear fin 432. In the depicted aspect, the first arm 610 generally extends in the longitudinal direction of the duct 404 and the second arm 614 generally extends in the transverse direction of the duct 404. Allowing for the independent movement of forward fin 430 and the plurality of rear fins 432, the connection of the first arm 610 with the second section 576 of the first link 560 is adapted so that rotation of the first link 560 about the transverse direction of the duct 404 (via rotation of the forward fin 430) does not cause corresponding rotation of the second link 562 about the vertical direction of the duct 404. According to one embodiment, the second end portion 604 of the second section 576 of the first link 560 is received in a housing 620 provided on the first arm 610. The housing 620 is configured to allow for rotation of the second end portion 604 while maintaining the connection of the second end portion 604 with the first arm 610. In the illustrated aspect, the housing 620 includes a slot 622 sized to receive the second end portion 604, and the second end portion 604 of the second section 576 of the first link 560 is spherical shaped. The spherical shaped second end portion 604 rotates in the housing 620 as the forward fin 430 is rotated about the transverse direction without corresponding rotation of the second link 562. And with the spherical shaped second end portion 604 received in the housing 620, the connection of the second section 576 of the first link 560 with the first arm 610 is secured as the first link 560 is moved in the transverse direction of the duct 404.

Figure 27:
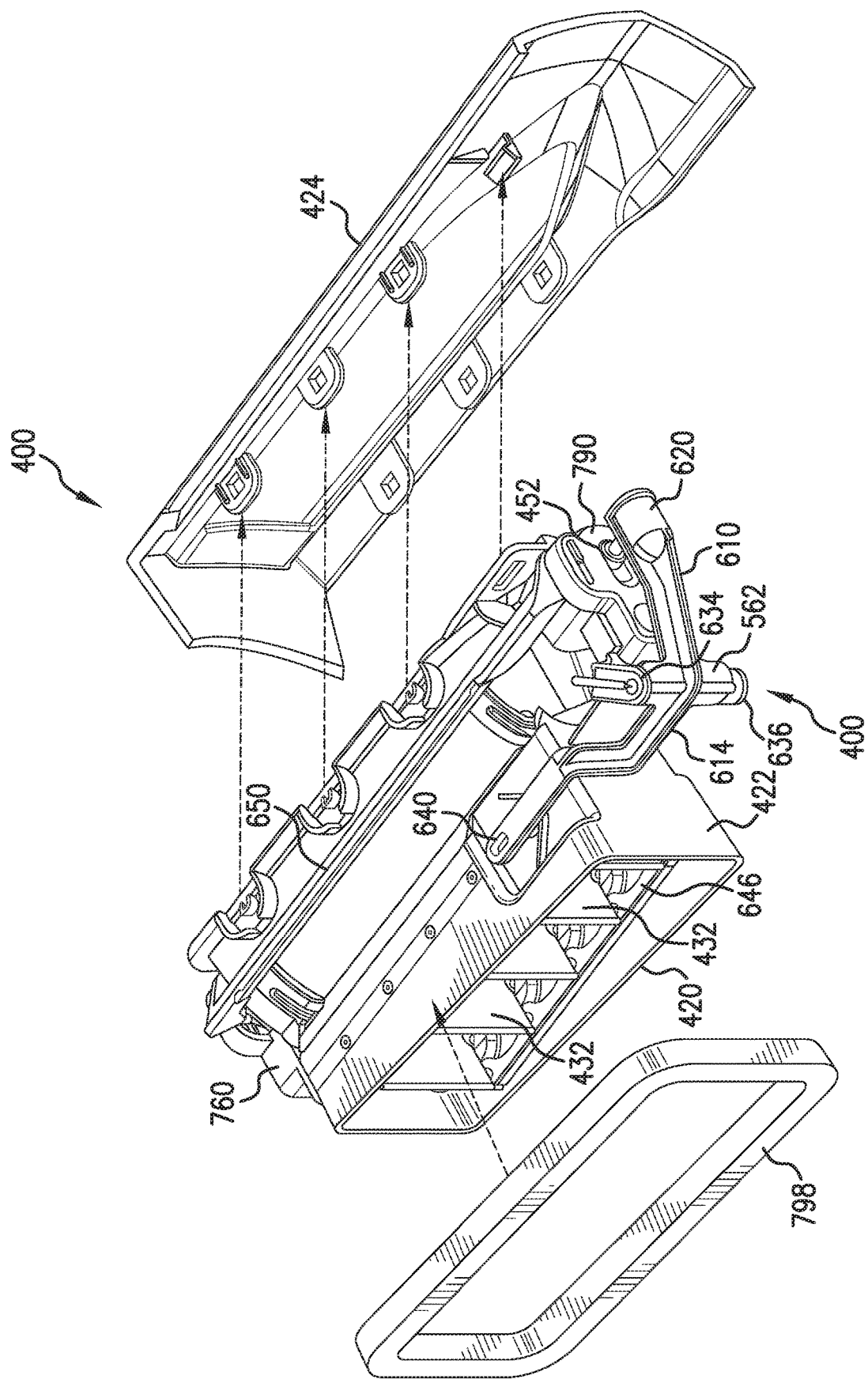

With reference to FIGS. 25 and 27, the second link 562 is located outside the duct 404 and is rotatably connected to the duct via pins 626, 628 which snap into corresponding holes 630, 632 provided on respective upper and lower mounting tabs 634, 636 extending from the duct 404. The pins 626, 628 define a rotational axis for the second link 562. The second arm 614 of the second link 562 is connected to that one rear fin 432' closest to the first sidewall 546. According to one aspect, a distal end of the second arm 614 includes a slot 640 sized to slidably receive the pin 558 of the clip 554. The linkage assembly 530 further includes a third link 646 having openings 648 sized to receive the connecting pins 520 of the rear fins 432. Therefore, the third link 646 interconnects the plurality of rear fins 432. It should be appreciated that rotation of the second link 562 causes the pin 558 to move within the slot 640, and this, in turn, causes rotation of the plurality of rear fins 432.

Figure 21:
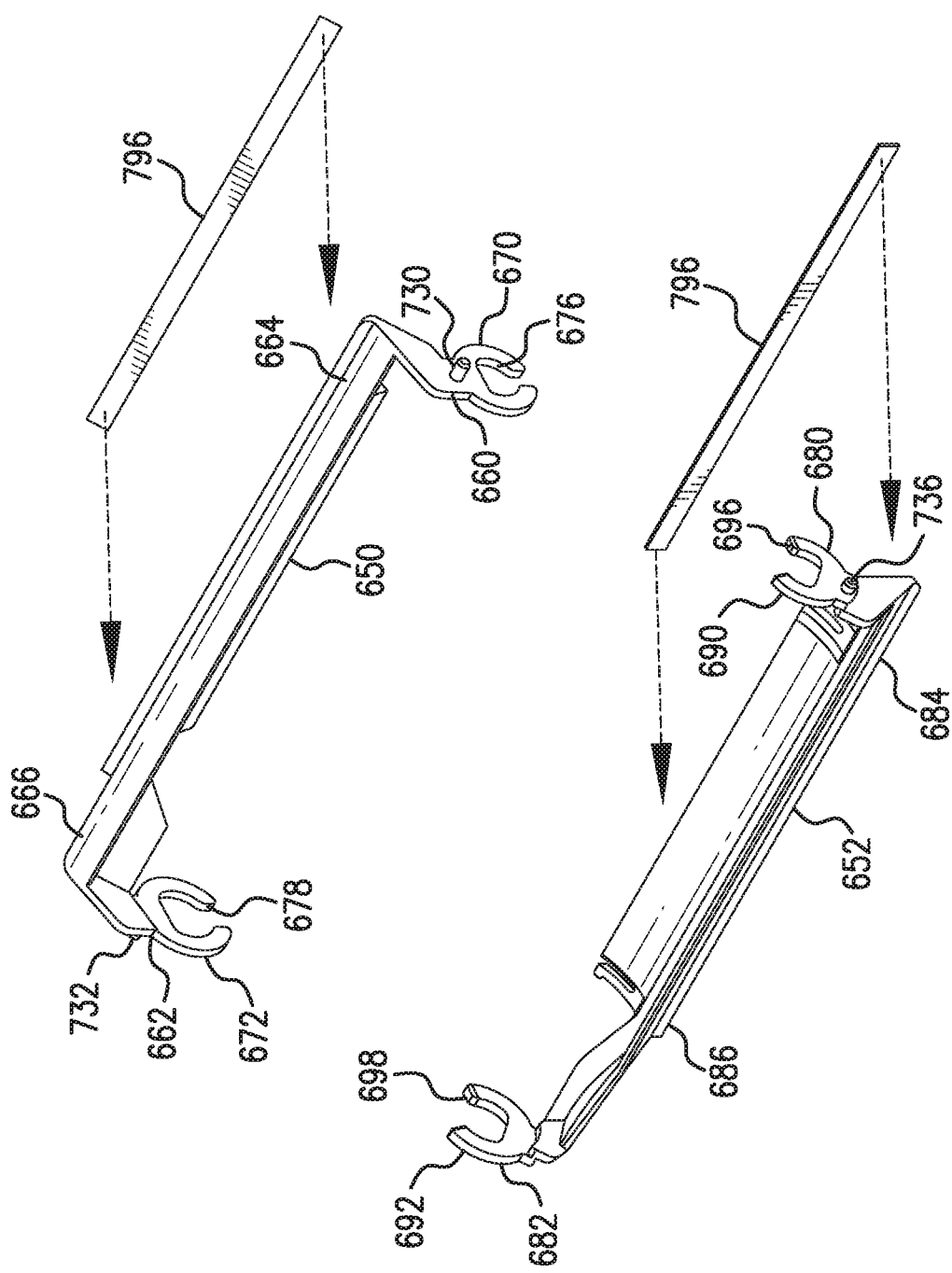
Figure 22:
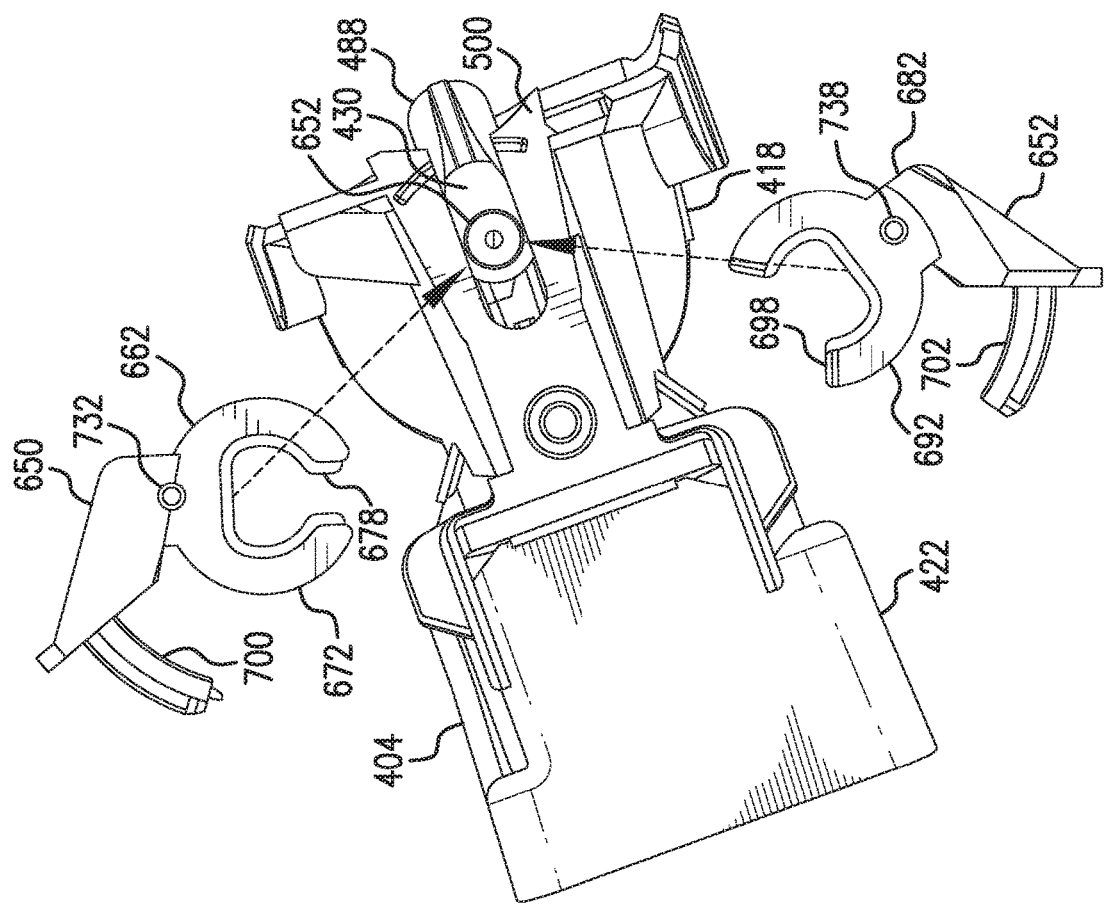

As indicated previously, and as depicted in FIGS. 21 and 22, the shut-off valve 436 is rotatably connected to the central portion of the duct 404 and positioned between the forward fin 430 and the plurality of rear fins 432. The shut-off valve 436 is directly connected to the forward fin 430 and is configured to rotate about the transverse direction between an open position and a closed position via movement of the forward fin in the longitudinal direction. According to one aspect, the shut-off valve 436 is defined by a first valve 650 and a second valve 652 each rotatably connected to the first and second sidewalls 496, 500 of the duct 404, and movement of the shut-off valve 436 toward the closed position rotates the first and second valves 650, 652 toward one another. As described above, the forward fin 430 includes the first axial pin 450 slidably received in the first slotted opening 498 located on the first sidewall 496 and the second axial pin 452 slidably received in the second slotted opening 502. The first valve 650 includes extensions 660, 662 located at opposite end portions 664, 666, and end portions 670, 672 of the respective extensions 660, 662 are configured to receive the first and second pins 450, 452. By way of example, the end portions 670, 672 can include slots 676, 678 sized to receive the first and second pins 450, 452. Similarly, the second valve 652 includes extensions 680, 682 located at opposite end portions 684, 686, and end portions 690, 692 of the respective extensions 680, 682 also include slots 696, 698 sized to receive the first and second pins 450, 452.

Further, with reference to FIGS. 30(a) and 30(b), each of the first valve 650 and second valve 652 includes an arcuate shaped surface 700, 702 which conforms to respective upper and lower curved surfaces 706, 708 located at the central portion of the duct 404. The arcuate shaped surfaces 700, 702 of the first and second valves 650, 652 are guided by the upper and lower curved surfaces 706, 708 of the duct 404 between the open position and closed position of the shut-off valve 436. In addition, the central portion of the duct 404 includes upper and lower inwardly extending ramped surfaces 714, 706 rearward of the upper and lower curved surfaces 706, 708. The upper and lower ramped surfaces 714, 716 direct airflow toward the forward fin 430. The duct 404 further includes an upper access opening 720 for the first valve 650 located between the upper curved surface 706 and the upper ramped surface 714, and a lower access opening 722 for the second valve 652 located between the lower curved surface 708 and the lower ramped surface 716.

Figure 23:
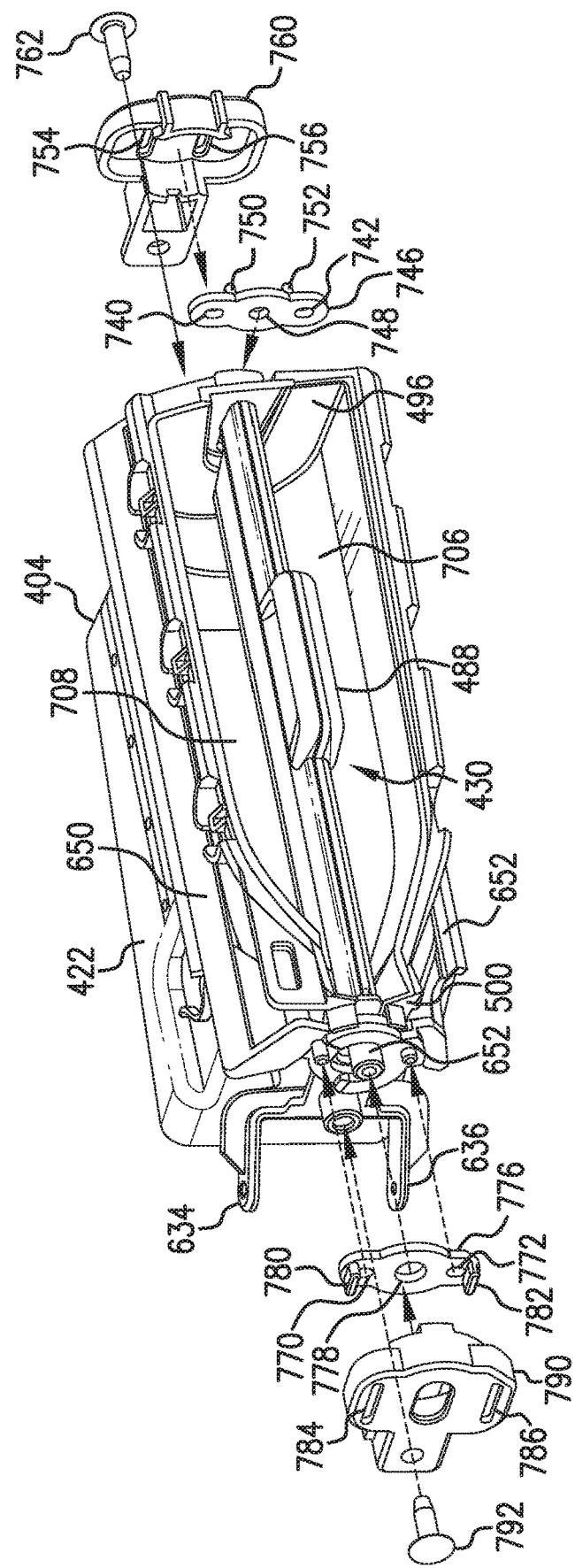

As depicted in FIGS. 21 and 22, pins 730, 732 are provided on outer surfaces of the respective extensions 660, 662 of the first valve 650, and pins 736, 738 are provided on outer surfaces of the respective extensions 680, 682 of the second valve 652. As depicted in FIG. 23, the pins 730, 732 fit within corresponding through holes 740, 742 located in a first spacer 746 which is secured to that portion of the first pin 450 extending outwardly from the first sidewall 496. As shown, the first pin 450 is received in an opening 748 on the first spacer 746. The first spacer 746 includes spaced tabs 750, 752 that are slidably received in spaced slots 754, 756 of a first bushing 760, which is secured to the first sidewall 496 via a fastener 762. Similarly, the pins 736, 738 fit within corresponding through holes 770, 772 located in a second spacer 776 which is secured to that portion of the second pin 452 extending outwardly from the second sidewall 500. As shown, the second pin 452 is received in an opening 778 on the second spacer 776. The second spacer 776 includes spaced tabs 780, 782 that are slidably received in spaced slots 784, 786 of a second bushing 790, which is secured to the second sidewall 500 via a fastener 792. It should be appreciated that movement of the forward fin 430 in the longitudinal direction of the duct 404 (to move the shut-off valve 436) moves the tabs of the first and second spacers 746, 776 within the slots of the first and second bushings 760, 790.

It should be appreciated that felt or foam 796 may be applied to edges of the first and second valves 650, 652 where the first and second valves meet in the closed position of the shut-off valve 436 to reduce noise and help ensure airflow though the duct 404 is sealed off. Further, foam 798 may be applied to the second end portion 422 of the duct 404 at the air inlet 420.

Figure 28B:
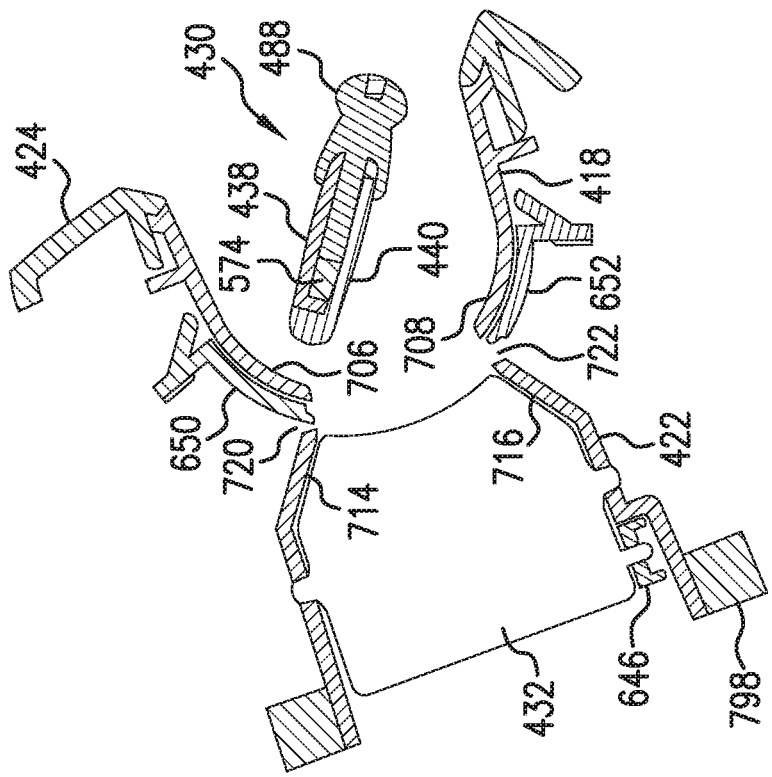
FIGS. 28(*a*)-30(*b*) are cross-sectional views showing the various operational states of the air vent of FIG. 16.
Figure 28A:
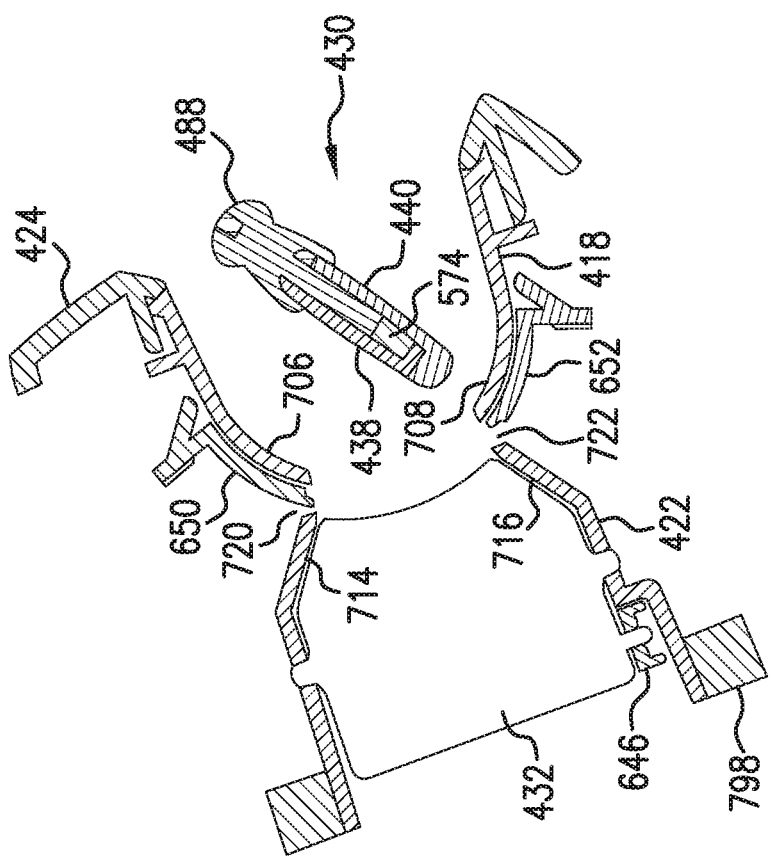

As is evident from the forgoing, the operation of the exemplary air vent 400 is simplified for the user. Every function of the air vent 400 may be operated by the forward fin 430. The forward fin 430 may be rotated about the transverse direction of the duct 404 (FIGS. 28(*a*) and 28(*b*)) and translated in the longitudinal direction of the duct 404 to move the shut-off valve 436 (FIGS. 30(*a*) and 30(*b*)), and the knob 488 of the forward fin 430 may be translated in transverse direction to rotate the plurality of rear fins 432 (FIGS. 29(*a*) and 29(*b*)). With the central location of the shut-off valve 436, the user can visibly see the open/close position of the shut-off valve 436, so no printed or embossed indicators are needed, except what might be placed on the knob.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air vent for a vehicle HVAC system comprising:
a duct including an air outlet at a first end portion and an air inlet at a second end portion spaced from the first end portion in a longitudinal direction of the duct;
a forward fin connected to the first end portion and rotatable about a transverse direction of the duct, the forward fin configured to adjust the direction of airflow in a vertical direction of the duct;
a plurality of rear fins connected to the second end portion of the duct and rotatable about the vertical direction, the plurality of rear fins configured to adjust the direction of airflow in the longitudinal direction of the duct; and
a shut-off valve rotatably connected to a central portion of the duct and positioned between the forward fin and the plurality of rear fins, the shut-off valve directly connected to the forward fin, the shut-off valve configured to rotate about the transverse direction between an open position and a closed position via movement of the forward fin in the longitudinal direction;
wherein the forward fin, the plurality of rear fins, and the shut-off valve are configured to rotate independently of one another.

2. The air vent according to claim 1, wherein the shut-off valve is defined by a first valve and a second valve each rotatably connected to the duct, wherein movement of the shut-off valve toward the closed position rotates the first and second valves toward one another.

3. The air vent of claim 2, wherein the forward fin includes an axial pin slidably received in a slotted opening located on a sidewall of the duct, and each of the first valve and second valve includes an extension having an end portion configured to receive the axial pin.

4. The air vent of claim 2, each of the first valve and second valve includes an arcuate shaped surface which conforms to respective upper and lower curved surfaces located at the central portion of the duct, wherein the arcuate shaped surfaces of the first and second valves are guided by the upper and lower curved surfaces of the duct between the open position and closed position of the shut-off valve.

5. The air vent of claim 4, wherein the central portion of the duct includes upper and lower inwardly extending ramped surfaces rearward of the upper and lower curved surfaces, the upper and lower ramped surfaces direct airflow toward the forward fin, and further including an upper access opening for the first valve located between the upper ramped surface and upper curved surface, and a lower access opening for the second valve located between the lower ramped surface and lower curved surface.

6. The air vent of claim 1, including a linkage assembly configured to rotate the plurality of rear fins, the linkage assembly includes a first link moveable in the transverse direction and a second link connected to the first link and at least one of the rear fins, the second link configured to rotate about the vertical direction via the transverse movement of the first link, wherein rotation of the second link rotates the plurality of rear fins.

7. The air vent of claim 6, wherein the forward fin defines a cavity elongated in the transverse direction and the first link is slidably received in the cavity.

8. The air vent of claim 7, wherein the forward fin includes a cutout extending into the cavity and exposing a portion of the first link received in the cavity, and the air vent further includes a knob having an engaging part slidably received in the cutout and connected to the portion of the first link.

9. The air vent according to claim 6, wherein the second link includes a first arm connected to an end portion of the first link and a second arm connected to the at least one rear fin.

10. The air vent of claim 9, wherein the end portion of the first link is spherical shaped, and the first arm includes a housing configured to receive the spherical shaped end portion, wherein the spherical shaped end portion rotates in the housing without corresponding rotation of the second link as the forward fin is rotated about the transverse direction.

11. The air vent of claim 9, wherein the second link is located outside of the duct, the second arm includes a slot and the at least one rear fin includes a pin slidably received in the slot, wherein rotation of the second link causes the pin to move within the slot.

12. An air vent for a vehicle HVAC system comprising:
a duct including an air outlet at a first end portion and an air inlet at a second end portion spaced from the first end portion in a longitudinal direction of the duct;
a forward fin connected to the first end portion and rotatable about a transverse direction of the duct, the forward fin configured to adjust the direction of airflow in a vertical direction of the duct;
a plurality of rear fins connected to the second end portion of the duct and rotatable about the vertical direction, the plurality of rear fins configured to adjust the direction of airflow in a longitudinal direction of the duct;
a shut-off valve rotatably connected to a central portion of the duct, the shut-off valve configured to rotate about the transverse direction between an open position and a closed position; and
a linkage assembly configured to rotate the plurality of rear fins, the linkage assembly includes a first link at least partially housed in the forward fin and moveable in the transverse direction and a second link connected to the first link and at least one of the rear fins, the second link configured to rotate about the vertical direction via the transverse movement of the first link, wherein rotation of the second link rotates the plurality of rear fins,
wherein the forward fin, the plurality of rear fins, and the shut-off valve are configured to rotate independently of one another.

13. The air vent of claim 12, wherein the forward fin defines a cavity elongated in the transverse direction and the first link is slidably received in the cavity.

14. The air vent of claim 13, further including a knob positioned on the forward fin and including an engaging part connected to a portion of the first link received in the cavity.

15. The air vent according to claim 12, wherein the second link includes a first arm connected to an end portion of the first link and a second arm connected to the at least one rear fin, wherein the second arm includes a slot, and the at least one rear fin includes a pin slidably received in the slot, wherein rotation of the second link causes the pin to move within the slot.

16. The air vent of claim 12, wherein the shut-off valve is directly connected to the forward fin and is rotatable via movement of the forward fin in the longitudinal direction.

17. The air vent according to claim 16, wherein the shut-off valve is defined by a first valve and a second valve each rotatably connected to the duct, wherein movement of the shut-off valve toward the closed position rotates the first and second valves toward one another.

18. The air vent of claim 17, wherein the central portion of the duct includes upper and lower inwardly extending ramped surfaces that direct airflow toward the forward fin, and each of the first valve and the second valve in the open position of the shut-off valve is concealed by upper and lower ramped surfaces.

19. An air vent for a vehicle HVAC system comprising:
a duct including an air outlet at a first end portion and an air inlet at a second end portion spaced from the first end portion in a longitudinal direction of the duct;
a forward fin connected to the first end portion and rotatable about a transverse direction of the duct, the forward fin configured to adjust the direction of airflow in a vertical direction of the duct;
a plurality of rear fins connected to the second end portion of the duct and rotatable about the vertical direction, the plurality of rear fins configured to adjust the direction of airflow in the longitudinal direction of the duct;
a shut-off valve rotatably connected to a central portion of the duct and positioned between the forward fin and the plurality of rear fins, the shut-off valve connected to the forward fin, the shut-off valve configured to rotate about the transverse direction between an open position and a closed position via movement of the forward fin in the longitudinal direction; and
a linkage assembly at least partially housed in the forward fin and connected to at least one of the rear fins, the linkage assembly configured to move in the transverse direction and rotate about the vertical direction via its transverse movement, wherein rotation of the linkage assembly rotates the plurality of rear fins,
wherein the forward fin, the plurality of rear fins, and the shut-off valve are configured to rotate independently of one another.

20. The air vent of claim 19, wherein the forward fin defines a cavity elongated in the transverse direction, and the linkage assembly includes a first link received in the cavity and moveable in the transverse direction and a second link connected to the first link and at least one of the rear fins, the second link rotatable about the vertical direction.

* * * * *